United States Patent

Chang

[19]

[11] Patent Number: 5,920,412
[45] Date of Patent: Jul. 6, 1999

[54] METHOD AND APPARATUS FOR SIGNAL ROUTING IN AN OPTICAL NETWORK AND AN ATM SYSTEM

[75] Inventor: Ning Chang, Atlanta, Ga.

[73] Assignee: BellSouth Corporation, Atlanta, Ga.

[21] Appl. No.: 08/639,263

[22] Filed: Apr. 24, 1996

[51] Int. Cl.$^6$ ................................................. H04S 14/02
[52] U.S. Cl. ........................ 359/128; 359/123; 370/353; 370/354
[58] Field of Search .................................. 359/119, 118, 359/117, 128, 110, 125, 123, 164; 370/452, 460, 353, 354

[56] References Cited

U.S. PATENT DOCUMENTS

| | | | |
|---|---|---|---|
| 5,406,401 | 4/1995 | Kremer | 359/110 |
| 5,406,549 | 4/1995 | Kremer | 370/16.1 |
| 5,416,768 | 5/1995 | Jahromi | 370/55 |
| 5,440,540 | 8/1995 | Kremer | 370/16.1 |
| 5,442,623 | 8/1995 | Wu | 370/16.1 |
| 5,479,082 | 12/1995 | Calvani et al. | 359/127 |
| 5,586,115 | 12/1996 | Nakano et al. | 359/117 |
| 5,657,142 | 8/1997 | Fahim | 359/110 |

OTHER PUBLICATIONS

Lee and Kostas, "Virtual Path (VP)–Based SONET/ATM Ring Architecture", Broadband Aspects of ISDN, GTE Telephone Operations, Dec. 4, 1995.

IBM: 9729 Optical Wavelength Division Multiplexor: *The Affordable Path to Optical Networking*, 1996.

IBM 9729 Optical Wavelength Division Multiplexor: *Operator's Manual*, First Edition, Oct., 1995.

*Primary Examiner*—Rafael Bacares
*Attorney, Agent, or Firm*—Jones & Askew, LLP

[57] ABSTRACT

A method and apparatus for optical signal routing in an optical network that includes one or more optical fibers to carry multiplexed signals. Each optical fiber may include a plurality of optical carriers with each optical carrier operating at a different wavelength. The optical network includes an optical network routing apparatus to receive the multiplexed signals from the optical fiber, to categorize the multiplexed signals as local signals or as non-local signals, to drop the local signals to a local switch, and to transmit the non-local signals to the optical fiber for further routing in the optical network. Advantageously, the transport of multiplexed signals on optical carriers of different wavelengths on a single optical fiber multiples by the number of optical carriers the bandwidth capacity of the optical fiber. Further, the optical network routing apparatus routes signals through the optical network, routes signals to a local switch associated with the optical network, and/or adds signals from the local switch to the optical network. The optical network routing apparatus includes an optical wavelength division demultiplexor to demultiplex multiplexed signals into signals based on wavelength. A type check categorizes the signals as local signals or as non-local signals. The type check transmits the local signals to a local switch based on signal type and/or wavelength. The type check also transmits the non-local signals to an optical wavelength division multiplexor, which multiplexes the non-local signals for further routing through the optical network.

8 Claims, 6 Drawing Sheets

METHOD AND APPARATUS FOR SIGNAL ROUTING IN AN OPTICAL NETWORK AND AN ATM SYSTEM

FIELD OF THE INVENTION

The present invention generally relates to communication systems, and more particularly, relates to a method and an apparatus for signal routing in an optical network. Even more particularly, the present invention relates to a method and an apparatus for the processing of information between, on the one hand, an asynchronous transfer mode switch and/or a synchronous transfer mode switch and, on the other hand, an optical network with an optical fiber that includes at least a first optical carrier of a first wavelength and a second optical carrier of a second wavelength.

BACKGROUND OF THE INVENTION

Recent advances and improvements in communications technology provide the communications industry with enormous opportunities to improve existing services and to branch into new services. Thousands of miles of fiber optic cable have been deployed in optical networks. These optical networks make possible the transmission of large amounts of information at great speeds. Optical networks have been used primarily to carry voice signals in telecommunication applications. However, the advanced features of optical networks allow for the transmission of other information such as data, video and multimedia signals.

Although optical networks provide opportunities for the delivery of new and improved services, the cost of these services to subscribers remains high. The high cost stands as an impediment to the promulgation and acceptance of the new and improved services. One reason for the high cost is an inefficiency in the transport of information through optical networks. The inefficiency is discussed in further detail below in connection with a brief description of information transport facilities including optical networks.

To deliver information from one point to another, and especially to deliver data, video or multimedia signals from one point to another, service providers have used information transport facilities that include a combination of an asynchronous transfer mode (ATM) system and one or more optical networks. To function, information must be passed back and forth between the ATM system and any associated optical network. A particular method and system for the addition of information from an ATM switch to an optical network and for the dropping of information from an optical network to an ATM switch is described in the patent application filed on Feb. 15, 1996, assigned U.S. Ser. No. 08/601,962 and entitled: A Method and System for Interfacing an ATM Switch and an Optical Network. This referenced patent application (U.S. Ser. No. 08/601,962) is incorporated herein by reference. The inventor of the subject matter and the assignee of the referenced patent application (U.S. Ser. No. 08/601,962) are the same as in the present application.

A basic description of an information transport facility that includes an ATM system and an optical network is provided below.

General Description of a Combination ATM System and Optical Network

Providers of communication network services have used information transport facilities that include a combination of an ATM system and one or more optical networks. An example of such a typical basic combination is illustrated in FIG. 1. In particular, FIG. 1 illustrates a ring optical network 8 with four hubs 9a–9d with the optical network 8 connected at one of the hubs 9d to an ATM switch 10. It will be appreciated that a combination ATM/optical network system may be configured differently.

An optical network is broadly defined as an information transport facility with fiber optic cables ("optical fibers" or "fibers") serving as the physical link or medium for information transport. Generally, an optical network is a synchronous digital network that conforms to certain standards that define a set of optical interfaces (STS-Nc signals) for network transport. These standards are referred to as SONET (synchronous optical network). SONET defines standard optical signals (STS-Nc signals), a synchronous frame structure for multiplexed digital information traffic, and operation procedures so that optical networks from different manufacturers/carriers may be interconnected.

FIG. 1 illustrates a basic SONET ring 8 including SONET hubs or nodes 9a–9d that are linked by fiber optic connections to form a closed loop or a ring. One or more optical fibers may be present in each fiber optic connection to carry the information. Typically, two fibers are present in each fiber optic connection with one of the fibers carrying information in a first direction, and the other fiber carrying information in the opposite direction. Further, each fiber generally includes only a single optical carrier (also referred to as a "channel" or "wavelength") that transports the information or signals on a designated wavelength. Presently, the wavelength in use is 1550 nanometers. Further, in an optical network, data is transmitted over an optical carrier at a transport signal of one of the higher STS-Nc signal levels, and use of the STS-12c signal level for data transmission is relatively common.

Still referring to FIG. 1, access to and from the SONET ring is available at any of the hubs 9a–9d. Information is added at a particular hub for transport along the SONET ring. Once the information has been added to the SONET ring at a particular hub, the information then is transported around the ring to an appropriate "destination" hub. The information then is dropped from the SONET ring at the "destination" hub onto some other information transport facility for further transmission to the information's ultimate destination. Each hub 9a–9d typically includes SONET multiplex/demultiplex equipment with additional ring functionality, and preferably includes an add-drop multiplexor (ADM), or another network element such as a digital cross-connect system (DCS) with similar functionality. Each add-drop multiplexor is used to add information to the SONET ring for further transport of the information along the SONET ring. Typically, an add-drop multiplexor merges two or more incoming data information streams into a fewer number of outgoing data streams at a higher rate. For example, an add-drop multiplexor may merge multiple data information streams transmitting at STS-1 or STS-3 signal levels into a data stream transmitting at a STS-12 signal level. Each add-drop ultiplexor also receives information from other add-drop multiplexors on the SONET ring. The add-drop multiplexor may pass this information to other add-drop multiplexors, or the add-drop multiplexor may drop this information from the SONET ring for further transport of the information on other information transport facilities. However, it is to be noted that the information is transported from an add-drop multiplexor on an optical fiber on an optical carrier having a particular wavelength.

The cost of transporting information in an optical network is based to a large extent on the optical fiber bandwidth that must be dedicated to transport the information. Compared to other information transport mediums, the typical optical fiber bandwidth is relatively great. Hence, the great interest in the use of optical networks for information transport.

Even though the bandwidth capacity of an optical network is great, such bandwidth capacity is not infinite. With only a single optical carrier on an optical fiber carrying signals, a high data rate has to be transmitted to make use of the limited optical fiber resources. High data rates are more difficult to work with in that it is more difficult to extract a designated channel from a carrier signal operating with high data rates. The limited amount of bandwidth in present optical networks and the difficulty in extracting information from an optical carrier operating at high data rates keep the cost of using an optical network for the transport of information high. The high cost leads to the concern that the many SONET rings that are already deployed may not remain cost-effective in an ATM network service environment for transport of new types of multimedia services, especially bursty ATM services. Further, any significant increase in the bandwidth capacity of an optical network requires changes, major and minor, to the manner in which information is transferred from an ATM system to an optical network and vice versa.

Thus, there is a need in the art for a method and an apparatus that allow for the delivery of new and improved services to subscribers over information transport facilities such as optical networks, that allow for such delivery in a quick, convenient and efficient manner, and that also allow for such delivery as inexpensively as possible. In particular, there is a need in the art for a method and an apparatus that provide for the transport of additional amounts of information through an optical network and on single optical fibers. Further, there is a need in the art for a method and an apparatus that provide for the routing of information between an ATM system and an optical network. Even further, there is a need in the art for a method and an apparatus in an optical network that routes information to and from the optical network, and that adds and drops information from and to a local switch, including an ATM switch or a synchronous transfer mode (STM) switch, and the optical network.

SUMMARY OF THE PRESENT INVENTION

As will be seen, the present invention satisfies the foregoing criteria. Generally described, the present invention provides a method and an apparatus for an optical network that includes one or more optical fibers to carry multiplexed signals such that each optical fiber may include a plurality of optical carriers with each optical carrier operating at a different wavelength. This optical network includes an optical network routing apparatus to receive the multiplexed signals from the optical fiber, to categorize the multiplexed signals as local signals or as non-local signals, to drop the local signals to a local switch, and to transmit the non-local signals to the optical fiber for further routing in the optical network. Advantageously, the transport of multiplexed signals on optical carriers of different wavelengths on a single optical fiber multiples by the number of optical carriers the bandwidth capacity of the optical fiber.

Still generally described, the present invention also provides a method and an optical network routing apparatus (ONRA) (also referred to as an "optical network routing agent") for use with an optical network that includes optical fibers that carry multiplexed optical signals including first signals on a first optical carrier of a first wavelength and second signals on a second optical carrier of a second wavelength. The optical network routing apparatus routes signals through the optical network, routes signals to a local switch associated with the optical network, and/or adds signals from the local switch to the optical network. Advantageously, the method and the optical network routing apparatus efficiently, economically and accurately handle the routing of signals, especially, in connection with the increased bandwidth capacity of the optical network as provided by the present invention.

With respect to the present invention of the optical network routing apparatus, the apparatus includes an optical wavelength division demultiplexor. The demultiplexor receives first multiplexed signals from a first optical fiber, demultiplexes the first multiplexed signals into first signals based on the first optical carrier having a first wavelength and into second signals based on the second optical carrier having a second wavelength. The demultiplexor transmits the first signals and the second signals to a type check. The type check categorizes the first signals and the second signals as local signals or as non-local signals, transmits the local signals to a local switch, and transmits the non-local signals to an optical wavelength division multiplexor. Preferably, the type check categorizes the first signals as local signals or as non-local signals based on a first wavelength and categorizes the second signals as local signals or as non-local signals based on a second wavelength. The type check also may categorize the first signals or the second signals as synchronous transfer mode (STM) signals based on wavelength and transmit the STM signals to an STM switch. In an embodiment, the type check preferably categorizes the first signals or the second signals as synchronous transfer mode (STM) signals, and transmits the STM signals to an STM add-drop multiplexor. The STM add-drop multiplexor preferably categorizes the STM signals as local STM signals or as non-local signals, transmits the local STM signals to a local STM switch and transmits the non-local signals to the optical wavelength division multiplexor. Further, the type check may categorize the first signals or the second signals as asynchronous transfer mode (ATM) signals based on wavelength, and transmit the ATM signals to an ATM add-drop switch. In an embodiment, the type check categorizes the first signals or the second signals as asynchronous transfer mode (ATM) signals, and transmits the ATM signals to an ATM add-drop multiplexor. The ATM add-drop multiplexor categorizes the ATM signals as local ATM signals or as non-local signals, transmits the local ATM signals to a local ATM switch, and transmits the non-local signals to the optical wavelength division multiplexor. In a further embodiment, the optical wavelength division multiplexor receives the non-local signals, multiplexes the non-local signals into second multiplexed signals, and transmits the second multiplexed signals to a second optical fiber for further routing in the optical network.

The present invention also provides an optical network routing apparatus for routing signals received from a local switch to an optical network. This apparatus includes an add-drop multiplexor. The add-drop multiplexor receives signals from the local switch, and transmits the signals to an optical wavelength division multiplexor. The optical wavelength division multiplexor receives the signals from the add-drop multiplexor, multiplexes the signals on a first optical carrier having a first wavelength with other signals on a second optical carrier having a second wavelength into multiplexed signals, and transmits the multiplexed signals to an optical fiber for further routing in the optical network. In an embodiment, the add-drop multiplexor is a synchronous transfer mode (STM) add-drop multiplexor, and the signals are STM signals. In another embodiment, the add-drop multiplexor is an asynchronous transfer mode (ATM) add-drop multiplexor, and the signals are ATM signals.

In addition, the present invention provides a method for routing signals through an optical network that includes optical fibers that carry multiplexed signals. The multiplexed optical signals include first signals on a first optical carrier of a first wavelength and second signals on a second optical carrier of a second wavelength. This method includes the step of demultiplexing with an optical wavelength division demultiplexor the first multiplexed signals into first signals based on the first optical carrier having the first wavelength and into second signals based on the second optical carrier having the second wavelength. The method also includes the step of checking whether the first signals and the second signals are local signals or are non-local signals. If either the first signals or the second signals are the local signals, then the method checks whether the local signals are synchronous transfer mode (STM) signals or are asynchronous transfer mode (ATM) signals. If the local signals are STM signals, then the method checks whether the STM signals are local STM signals or are non-local signals. If the STM signals are the local STM signals, then the method processes the local STM signals to a local STM switch. If the local signals are ATM signals, then the method checks whether the ATM signals are local ATM signals or are the non-local signals. If the ATM signals are local ATM signals, then the method processes the local ATM signals to a local ATM switch. With respect to the non-local signals, the method multiplexes with an optical wavelength division multiplexor the non-local signals into second multiplexed signals. Then the method transmits the second multiplexed signals for further routing in the optical network.

Therefore, it is an object of the present invention to provide an improved method and apparatus for signal routing in an optical network.

It is a further object of the present invention to provide an optical network that includes an optical fiber with optical carriers of different wavelengths for the transport of signals.

It is also an object of the present invention to provide a method and an apparatus that include an optical network routing apparatus for routing of the signals through an optical network and to/from a local switch.

It is a further object of the present invention to provide a method and an apparatus that routes signals that are carried by an optical fiber on one or more optical carriers respectively of different wavelengths based on the wavelength of the optical carrier carrying the signals.

It is yet an additional object of the present invention to provide a method and an apparatus that routes signals that are carried by an optical fiber on one or more optical carriers of different wavelengths based on the categorization of the signals as asynchronous transfer mode signals or as synchronous transfer mode signals.

Other features and advantages of the present invention will be apparent to persons skilled in the art from the following detailed description of a preferred embodiment accompanied by the attached drawings wherein identical reference numerals will refer to like parts and steps in the various views.

DETAILED DESCRIPTION OF THE PREFERRED EMBODIMENT

Introduction

Generally described, the present invention provides a method and an apparatus for an optical network that includes one or more optical fibers to transport multiplexed signals such that each optical fiber may include a plurality of optical carriers with each optical carrier operating at a different wavelength. Advantageously, the transport of multiplexed signals on optical carriers of different wavelengths on a single optical fiber multiples by the number of optical carriers the bandwidth capacity of the optical fiber. Thus, if an optical network presently uses a single optical carrier on a single optical fiber to transport signals, then use of the present invention with ten optical carriers on a single optical fiber results in a dramatic ten-fold increase in the bandwidth capacity of the optical fiber.

Still generally described, the present invention provides a method and an optical network routing apparatus (ONRA) (also referred to as an "optical network routing agent") for use with the optical network to route signals through the optical network, to route signals to a local switch associated with the optical network, and/or to add signals from the local switch to the optical network. Advantageously, the method and the optical network routing apparatus efficiently, economically and accurately handle the routing of signals, especially, in connection with the increased bandwidth capacity of the optical network as provided by the present invention.

Figure 1:
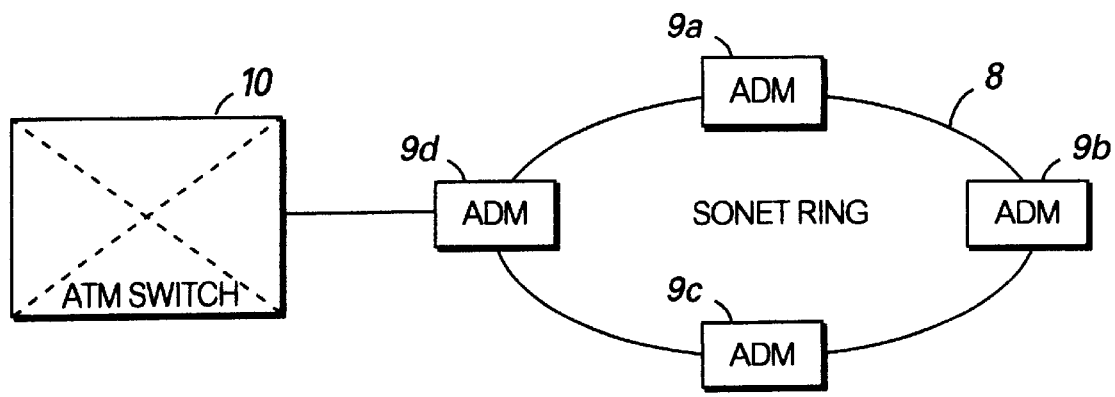
FIG. 1 illustrates a SONET ring optical network connected to an ATM system.
Figure 2:
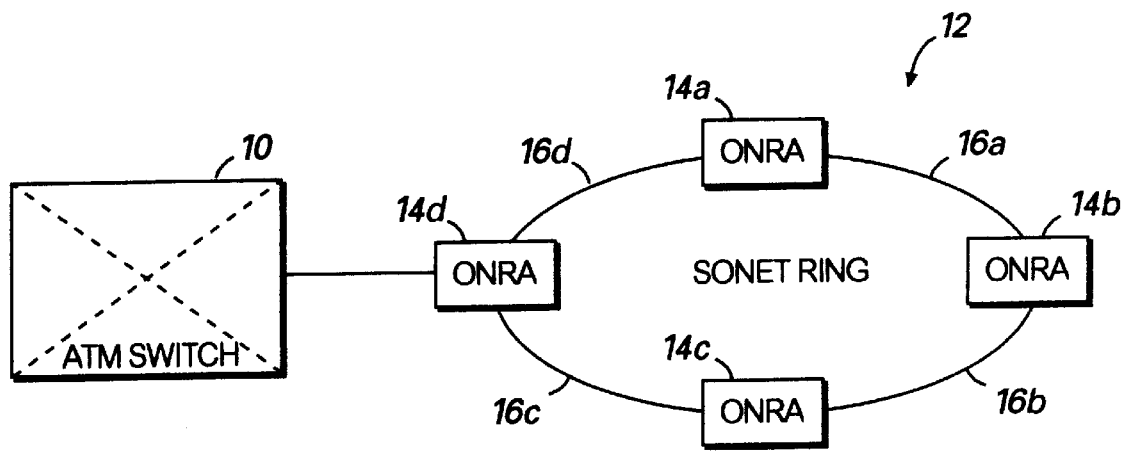
FIG. 2 illustrates the preferred embodiment of an optical network including a SONET ring connected to an ATM system.

Overview of the Present Invention—FIG. 2

FIG. 2 illustrates the preferred embodiment of an optical network 12 including a SONET ring connected to an ATM system 10, hereinafter referred to as ATM switch 10. Those skilled in the art will understand that a device(s) of the same functionality as the ATM switch 10 may be used in its place. In addition, optical network 12 preferably is a SONET ring including at least one hub comprising an optical network routing apparatus (ONRA). The SONET ring 12 illustrated in FIG. 2 includes four hubs 14a–14d comprising an optical network routing apparatus at each hub and with optical network routing apparatus 14d being connected to ATM switch 10. The present invention also contemplates the association of one or more STM stations or switches (not illustrated) with one or more of the optical network routing apparatus 14a–14d. An STM switch is included in the detail of the present invention provided in connection with FIG. 4. It will be appreciated that the present invention may be configured differently by, for example, including more or fewer hubs, or connecting to more than one ATM system, or to other communication systems. It will be further appreciated that ATM switch 10 and optical network 12 are connected to other equipment, network elements, and physical links that are not shown, but are generally present in a communications network.

FIG. 2 also illustrates the signal transport medium of the optical network of the present invention. In particular, FIG. 2 illustrates four fiber optic connections 16a–16d with each fiber optic connection disposed between two hubs such that hubs or nodes 14a–14d are linked by fiber optic connections to form a closed loop or a ring. Of course, more or fewer fiber optic connections may be present depending on the number of hubs of the SONET ring.

Further, one or more optical fibers may be present in each fiber optic connection to carry the signals through the optical network. As those skilled in the art will understand, three types of SONET ring architectures have been defined: (1) A Unidirectional Path-Switched Ring (UPSR); (2) A Two-Fiber Bidirectional Line-Switched Ring (BLSR); and (3) A Four-fiber Bidirectional Line-Switched Ring (BLSR). All three architectures provide physical circuit protection for improved transport survivability, to-wit: self-healing via SONET path selection on the UPSR; and automatic protection switching (APS) on the BLSR. Additional information regarding these SONET ring architectures and SONET may be obtained from SONET G.707/708/709, SONET standards CCITT (now ITU), Geneva, Switzerland. Further information on SONET may be obtained from the following standards: ANSI T1.103-1988 American National Standard for Telecommunications: Digital Hierarchy—Optical Interface Rates and Formats Specifications and ANSI T1.106-1988 American National Standard for Telecommunications: Digital Hierarchy—Optical Interface Specifications (Single Mode).

The present invention operates with all three ring architectures and operates in generally the same manner with all three ring architectures. In the preferred embodiment, the ring architecture is the Two-Fiber Bidirectional Line-Switched Ring (BLSR) in that each of the fiber optic connections 16a–16d includes two optical fibers with a first optical fiber carrying signals in a first direction and a second optical fiber carrying signals in the opposite direction. A Two-Fiber Bidirectional Line-Switched Ring (BLSR) reserves one-half of each optical fiber's bandwidth for protection of the other optical fiber's working traffic.

More particularly, the present invention preferably provides an optical network that includes a fiber optic connection with two optical fibers. It is preferred that the optical fibers be single mode eight $\mu$m fibers to minimize high losses. Each of these optical fibers is capable of carrying more than one optical carrier with each of the optical carriers operating at a different wavelength.

Figure 3:
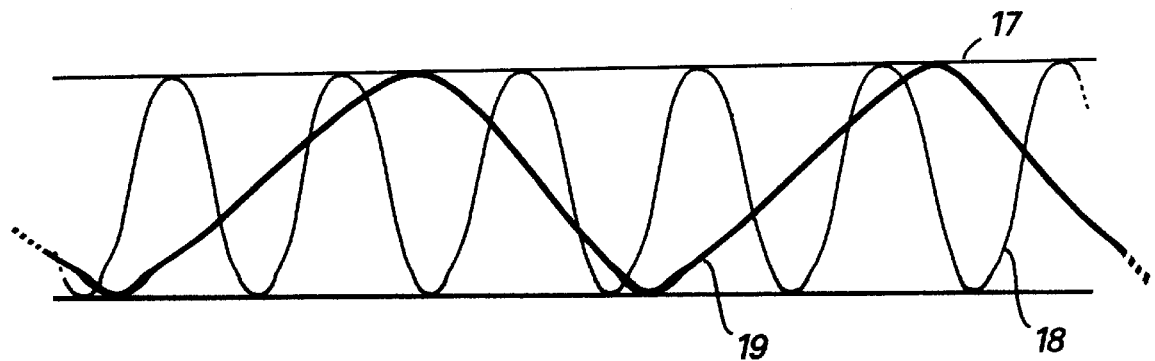
FIG. 3 which illustrates a portion of an optical fiber and two optical carriers carried on the optical fiber.

In the present invention, each optical carrier of an optical fiber carries signals, but carries the signals along a different wavelength from other optical carriers so that the integrity of the signals is protected. For example, reference is made to FIG. 3 which illustrates a portion of an optical fiber 17 and two optical carriers 18 and 19 carried on the optical fiber 17. As can be seen from FIG. 3, optical carrier 18 operates at a higher frequency, and thus, at a shorter wavelength than optical carrier 19, which is indicated by the darker line. As noted above, the operation of the different optical carriers at different wavelengths preserves the integrity of the signals that they are respectively carrying. Moreover, as a result of the relative immunity of any interference between the signals and/or the optical carriers, each of the optical carriers may carry signals that use a different communication protocol, bit rate, or even frame format from the signals that are being carried on other optical carriers of the optical fiber. Advantageously, the preservation of the integrity of signals carried on any particular optical carrier within an optical fiber allows service providers great flexibility in the transport of information in an optical network such as the present invention.

For purposes of this patent application, the totality of the signals carried by an optical fiber on different optical carriers operating at different wavelengths are referred to herein as multiplexed signals. They are referred to as multiplexed signals because the signals have been transmitted for transport on the optical fiber and its respective optical carriers through a wavelength division multiplexing process. Additional information regarding wavelength division multiplexing is provided below in connection with FIG. 4.

Referring again to FIG. 2, the present invention includes a method and an apparatus for routing signals through the optical network, to route or drop signals to a local switch associated with the optical network, and/or to add signals from the local switch to the optical network. The lion's share of this routing falls to the optical network routing apparatus (ONRA) 14a–14d. With respect to adding signals to the optical network 12, signals that are to be routed through the optical network 12 are added at a particular optical network routing apparatus for transport along the SONET ring. The terms "addition" or "adding" are used synonymously herein with the terms "transfer" or "transmitted" in the context of information transfer, except that the terms "addition" or "adding" are specifically used when information is transferred from a local switch such as an ATM switch or an STM switch to an optical network. Once the signals have been added to the SONET ring at a particular optical network routing apparatus, the signals are then transported as multiplexed signals on a fiber optic connection around the ring to an appropriate "destination" optical network routing apparatus. The signals then are dropped from the SONET ring at the "destination" optical network routing apparatus onto some other information transport facility for further transmission to the information's ultimate destination. The terms "drop" or "dropping" are used synonymously herein with the terms "transfer" or "transmitted" in the context of information transfer, except that the terms "drop" or "dropping" are specifically used when information is transferred from an optical network to a local switch such as an ATM switch or an STM switch.

Further with respect to the routing of multiplexed signals through the optical network 12 from an entry point to the optical network 12 to the ultimate destination of the multiplexed signals, the multiplexed signals pass through one or more optical network routing apparatus. For example, as illustrated in FIG. 2, as the multiplexed signals pass through optical network routing apparatus 14d, the apparatus checks whether the multiplexed signals are to be routed or dropped to a local switch, i.e., the associated ATM switch 10. In other words, the optical network routing apparatus 14d checks or categorizes the multiplexed signals as local signals or as non-local signals. If the multiplexed signals are non-local signals, then the non-local signals are transmitted via a fiber optic connection to another optical network routing apparatus, such as apparatus 14a or apparatus 14c, or are transmitted for further routing in the optical network 12. If the signals are local signals, this indicates that they are to be routed or dropped to the associated ATM switch 10, (or an STM switch) and the optical network routing apparatus 14d provides for such routing or dropping.

Additional information regarding a preferred optical network routing apparatus as used in connection with the present invention is provided below in connection with FIGS. 4–9.

Figure 4:
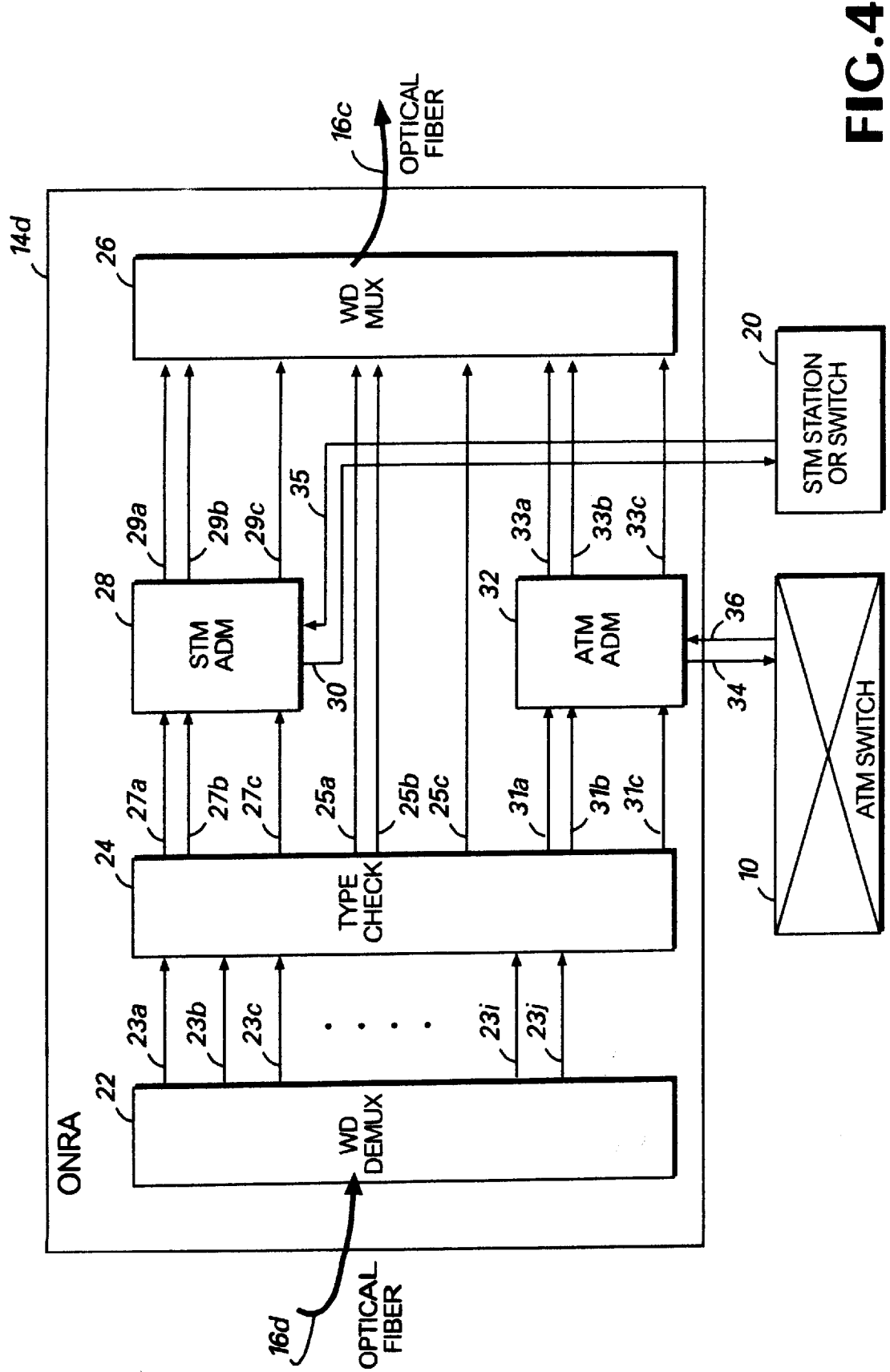
FIG. 4 is a functional block diagram of the preferred optical network routing apparatus illustrated in FIG. 2.

Optical Network Routing Apparatus—FIG. 4

FIG. 4 is a functional block diagram of one of the preferred optical network routing apparatus 14d illustrated in FIG. 2. Generally, all of the optical network routing apparatus such as apparatus 14a–14d function in a similar manner and differ in operation only with respect to the particular associated elements (such as the association or lack thereof of a local switch, such as an ATM switch or an STM switch). In particular, FIG. 4 is a functional block diagram of the preferred optical network routing apparatus 14d shown in FIG. 2 in position between fiber optic connection 16d (also referred to as optical fiber 16d) and fiber optic connection 16c (also referred to as optical fiber 16c). FIG. 4 also illustrates preferred optical network routing apparatus 14d in its connection to ATM switch 10 and to synchronous transfer mode (STM) station or switch 20. The STM switch 20 is not illustrated in FIG. 2. It will be clear to those skilled in the art that the preferred optical network routing agent 14d need not always be connected to both an ATM switch 10 and an STM switch 20. But in general, it may be said that an optical network routing apparatus, as the entry/exit point for signals from optical network 12 will be connected to either an ATM switch, an STM switch or both.

Further, with respect to FIG. 4 as well as the other figures of this patent application, the blocks illustrated in the figures represent the preferred functions carried out by the item illustrated. The blocks are arranged in the manner of a flow diagram with directional arrows so that the general sequence of performing the preferred functions will be apparent to those skilled in the art.

With respect to the routing of signals in the optical network 12, the optical network routing apparatus 14d receives multiplexed signals from an optical fiber 16d. For ease of explanation and by way of example, it will be assumed that the multiplexed signals on optical fiber 16d include first signals on a optical carrier of a first wavelength and signals on another optical carrier of a second wavelength. Although reference herein is made to only first signals and second signals, it will be appreciated that additional signals on respective additional optical carriers of different wavelengths may be included as part of the multiplexed signals.

A brief explanation is offered at this point with respect to the multiplexing of signals onto an optical fiber, and in particular, an example is provided as to how the two groups of signals referenced come to be multiplexed onto a single optical fiber 16d. In the preferred embodiment, there are several different types of parameters that must be defined by the system operator. One of these types of parameters is the definition of specific optical carriers for the transport of certain groups of signals. Advantageously, the system operator may define this parameter to best suit the system's needs. As an example, reference is made to Table 1 set forth below:

TBLE 1

| Wavelength of Optical Carrier | Destination | STM/ATM |
| --- | --- | --- |
| 1300 nm | Atlanta | STM |
| 1330 nm | New York | STM |
| 1430 nm | Atlanta | ATM |

A system operator may define the system such that:
1. The optical carrier operating at a wavelength of 1300 nm carries groups of signals that are destined for an optical network routing apparatus (ONRA) (or associated local switch) that serves Atlanta and that are STM signals;
2. The optical carrier operating at a wavelength of 1330 nm carries groups of signals that are destined for an ONRA (or associated local switch) that serves New York and that are STM signals; and
3. The optical carrier operating at a wavelength of 1430 nm carries groups of signals that are destined for an ONRA (or associated local switch) that serves Atlanta and that are ATM signals. It will be appreciated that these parameters may be defined differently, include definitions for fewer or more optical carriers, include different destinations and signal types, and be re-defined as necessary.

In the preferred embodiment, the two groups of signals are multiplexed for transport on an optical fiber by a wavelength division multiplexor. This multiplexing will have been based on the system definitions referenced above with respect to the correlation between a group of signals and an optical carrier. This multiplexing will have taken place at the previous optical network routing apparatus through which the signals were transported or routed or at the apparatus at which they were added. For example, referring to FIG. 2, such multiplexing may have taken place at optical network routing agent 14a. With respect to multiplexing, the preferred wavelength division multiplexor is the IBM 9729 Optical Wavelength Division Multiplexor/Demultiplexor (9729 Optical WDM) Model 001. The 9729 Optical WDM is described in the documents entitled: IBM 9729 Optical Wavelength Division Multiplexor—The Affordable Path to Optical Networking, and IBM 9729 Optical Wavelength Division Multiplexor—Operator's Manual. These documents were published in 1996 and 1995, respectively, and may be obtained from IBM, Network Hardware Division, Research Triangle Park, N.C., 27709. These documents are incorporated by reference as if fully set forth herein. A conventional optical fiber has an accessible bandwidth of 25,000 GHz. The 9729 Optical WDM makes use of as much of this bandwidth as possible. Each optical carrier of a particular bandwidth can carry a signal at any bit rate less than an upper limit defined by the electronics, typically up to several gigabits per second. The 9729 Optical WDM uses twenty optical carriers of different wavelengths (also referred to as different colors) spaced about 1 nm apart (about 120 GHz) in the 1.5 micrometer wavelength band. Ten of these channels are used for transmission in one direction and ten in the opposite direction on the same fiber. The actual signal bandwidth that the electronics can handle is over one wavelength, which is a small fraction of the inter-channel spacing. Thus, the signals do not interfere with each other and can therefore be multiplexed into a single fiber.

With respect to our example of the multiplexed signals on optical fiber 16d, it will be understood given the explanation in the immediately preceding paragraph that a wavelength division multiplexor multiplexed a first group of signals on a first optical carrier of a first wavelength (such as 1300 nm wavelength) and the second signals on a second optical carrier of a second wavelength (such as 1350 nm wavelength). Typical intervals of wavelengths between optical carriers on an optical fiber are 30 nm or 50 nm.

Further with respect to the routing of the multiplexed signals, it has been stated that these signals are received from the optical fiber 16d. In particular, these signals are received by an optical wavelength division demultiplexor 22 of the optical network routing agent 14d. As with the optical wavelength division multiplexor mentioned above in connection with the multiplexing of signals, the preferred optical wavelength division demultiplexor is the IBM 9729. With respect to multiplexing, the preferred wavelength division multiplexor is the IBM 9729 Optical Wavelength Division Multiplexor/Demultiplexor (9729 Optical WDM) Model 001. The signals that are received at the optical wavelength demultiplexor 22 are optical signals, and may include asynchronous transfer mode (ATM) signals on an optical carrier of a selected wavelength, synchronous transfer mode (STM) signals on another optical carrier of a different wavelength, or both types of signals on respective different optical carriers. Further, these signals may be destined for a local switch associated with the optical network routing apparatus through which the signals are passing, or the signals may be destined for a different optical network routing apparatus or a switch associated with a different optical network routing apparatus.

At the optical wavelength division demultiplexor 22, the multiplexed signals are demultiplexed into multiple information streams, each possibly using a different communication protocol, bit rate and/or frame format, from the single optical fiber 16d. The 9729 Optical WDM can demultiplex ten full duplex information streams, each stream transmitting at potentially up to 1 Gb/s over a single optical fiber. Thus, the use of a wavelength division multiplexor/demultiplexor enables economical transmission of many simultaneous information streams bidirectionally over a single fiber. With respect to our example of the multiplexed signals from the optical fiber 16d, the multiplexed signals are demultiplexed into a first group of signals based on the first optical carrier having a first wavelength. The multiplexed signals are also demultiplexed into a second group of signals based on the second optical carrier having a second wavelength.

In an alternate embodiment, one or more optical wavelength demultiplexors such as optical wavelength demultiplexor 22 may be provided in cascade so that multiplexed signals may be demultiplexed at a first demultiplexor, and then further demultiplexed at a second, third, etc. demultiplexor. Advantageously, a set of cascaded demultiplexors allows for the demultiplexing of relatively complex multiplexed signals, and thereby, allows for the use of a maximum amount of bandwidth of the optical carriers and of the optical fibers which carry them.

From the optical wavelength division demultiplexor 22, the demultiplexed signals are provided pursuant to wavelength on separate optical fibers as illustrated by arrows 23a–23j to a type check 24. Preferably, each of the outputs ("fibers") 23a–23j is dedicated for transmission of signals carried in an optical carrier of a selected bandwidth on optical fiber 16d. The dedication of one or more of the WD Demux outputs or ports 23a–23j to carry respective groups of signals based on the wavelength of the optical carrier that carried a group of signals is a system parameter that must be defined by the system operator. Advantageously, the system operator may arrange the output dedication to the best configuration to suit the system's needs. As an example, reference is made to Table 2 set forth below:

TABLE 2

| Port | Wavelength | Local/Non-Local | STM/ATM |
|------|------------|-----------------|---------|
| 23a  | 1300 nm    | Local           | STM     |
| 23j  | 1430 nm    | Local           | ATM     |

A system operator may define the system such that WD Demux 22 transmits on port 23a all signals that have been carried by an optical carrier operating at a wavelength of 1300 nm and such that WD Demux 22 transmits on port 23j all signals that have been carried by an optical carrier operating at a wavelength of 1430 nm. If communications traffic changes, the system operator may re-define these parameters as necessary.

As noted, the demultiplexed signals are provided by signal groups based on wavelength on dedicated outputs 23a–23j from WD Demux 22 to a type check 24. The general function of type check 24 is to categorize the demultiplexed signals as non-local signals or as local signals, and then to categorize the local signals as either synchronous transfer mode (STM) signals or as asynchronous transfer mode (ATM) signals. "Non-local signals" are signals that are not destined for a local switch associated with optical network routing agent 14d such as an associated ATM switch 10 or an STM switch 20. "Local signals" are signals that are destined for a local switch. Type check 24 categorizes the demultiplexed signals based on the wavelength associated with each group of the demultiplexed signals. In the preferred embodiment, this categorization does not involve any sophisticated intelligence on the part of type check 24. Rather, the categorization is based on receipt of groups of signals at respective dedicated ports or inputs 23a–23j (also referred to as outputs 23a–23j from WD Demux 22). In other words, the determination of a wavelength associated with a group of signals is made by type check 24 based on the port of the optical wavelength demultiplexor 22 that provides the signals to type check 24, or based on the port of the type check 24 that receives the signals. After determining the wavelength, type check 24 then categorizes the signals as non-local, local, but if local then as STM or ATM signals. This categorization and further processing may be automatic in that hardware implementation of the type check 24 may provide for system definition of such categorization and processing. For example, type check 24 may be implemented in hardware with system definition that all signals received from WD Demux 22 on port 23a are STM signals (see Table 2 above). Pursuant to this set-up, type check 24 simply transmits all signals received on port 23a to STM ADM 28. In that case, type check 24 does not need to "know" the wavelength of the optical carrier that carried the signals. Of course, since the designation of port 23a as the transmitter of STM signals is system defined, an operator of the system may re-define the parameters such that, after re-definition, the type check 24 transmits signals received on port 23a to a different (or even the same) definition.

To those skilled in the art, it will be apparent that type check 24 may be provided with a table or database with information regarding the wavelengths of optical carriers operating in the optical network and the respective destinations associated with the wavelengths or with the types of signals (STM or ATM) associated with the wavelengths. It should be noted that the association of a particular wavelength to carry signals of a certain type or destined for a particular location is arbitrary. Nonetheless, such associations between wavelengths and signal type or destination must be uniform throughout the optical network in order to properly route signals through the optical network. The information in the type check's table or database may be and should be updated from 35 time to time to reflect current associations between wavelengths and signal type or destination.

After type check 24 categorizes a group of signals, it transmits the signals to an appropriate place as described below. The transmission of the signals is carried out by optical fibers indicated by arrows 25*a*–25*c,* 27*a*–27*c,* and 31*a*–31*c.* in FIG. 4. These fibers are also referred to as "outputs", "output ports" or "ports". As with the inputs 23*a*–23*j* to type check 24, the definition of a specific output for the transmission of a particular group of signals is a system parameter that preferably may be defined (and re-defined) by the system operator to best suit the system's needs. Another type of parameter preferably for definition by the system parameters is the definition of specific inputs or input ports as indicated by arrows 25*a*–25*c,* 29*a*–29*c* and 33*a*–33*c* for the delivery of respective groups of signals to the optical wavelength division multiplexor ("WD Mux") 26. Referring still to FIG. 4, if type check 24 categorizes a group of signals as non-local signals, then type check 24 transmits the non-local signals as indicated by arrows 25*a*–25*c* to an optical wavelength division multiplexor 26. Pursuant to system definitions provided by the system operator, WD Mux 26 recognizes the signals received on inputs 25*a*–25*c* as non-local signals, and further, as signals to be multiplexed to respective optical carriers of selected wavelengths. As is described in further detail below, optical wavelength division multiplexor 26 multiplexes the non-local signals (with or without other non-local signals) into multiplexed signals. Preferably, optical wavelength division multiplexor 26 multiplexes a particular group of non-local signals for transmission by an optical carrier operating at a wavelength that corresponds to that particular group of non-local signals, either based on the destination of the non-local signals and/or on the type of the non-local signals. Typically, a group of non-local signals is multiplexed for transmission on an optical carrier operating at the same wavelength of the optical carrier that transported the group of non-local signals to that particular optical network routing agent. For example, if a group of non-local signals came into optical network routing apparatus 14*d* on an optical carrier operating at 1300 nm wavelength, then the group will be multiplexed for transmission on optical carrier of the same 1300 nm wavelength. After multiplexing the non-local signals, then optical wavelength division multiplexor 26 transmits the multiplexed signals to optical fiber 16*c* for further transport along the optical network 12.

If type check 24 categorizes a group of signals as local signals, then type check 24 transmits the local signals to a local switch such as associated ATM switch 10 or STM switch 20. From the local switch, the signals are further routed to their respective destinations. In the preferred embodiment, type check 24 further reviews local signals to determine whether the local signals are STM signals or are ATM signals. As with the local/non-local categorization, the categorization of the local signals as STM or ATM signals is based on the wavelength of the optical carrier associated with the signals. As also with the local/non-local categorization, type check 24 may "know" that a particular group of signals comprise ATM or STM signals based on the port on which these signals were received. Although the process of categorizing the signals as STM or ATM signals has been presented in a two step approach, it will be appreciated by those skilled in the art that the categorization of demultiplexed signals as STM signals or as ATM signals may be accomplished in a single step. The use of the two step or one step approach depends primarily on the implementation of type check 24 to make the categorization.

If type check 24 categorizes the local signals as STM signals, then type check 24 preferably transmits the signals as indicated by arrows 27*a*–27*c* to a synchronous transfer mode (STM) add-drop multiplexor 28. As will become apparent from the discussion below in connection with FIG. 6, the STM add-drop multiplexor 28 comprises conventional elements used in optical networks and particularly in SONET rings to add/drop signals to/from an optical network and to/from associated network elements such as STM switch 20. As also discussed below in connection with FIG. 6, STM add-drop multiplexor 28 checks the STM signals to determine whether they are local signals or are non-local signals.

The careful reader will be correct in noticing that a determination between local and non-local signals will have already been made by type check 24. However, type check 24 made its determination with respect to local/non-local signals based on the wavelength of an entire group of signals. Thus, to be passed from type check 24 as indicated by arrows 25*a*–25*c* to optical wavelength division multiplexor 26, the entire group of signals examined by type check 24 will have to be destined for a different optical network routing apparatus or associated switch.

In contrast, the STM signals received by STM add-drop multiplexor 28 may be all local STM signals, all non-local STM signals or a combination of local and non-local STM signals. STM add-drop multiplexor 28 sorts out the non-local STM signals from the local STM signals. In other words, STM add-drop multiplexor 28 categorizes the STM signals as local STM signals or as non-local signals. As indicated by arrows 29*a*–29*c,* STM add-drop multiplexor 28 transmits the non-local STM signals to the optical wavelength division multiplexor 26. From there, the non-local STM signals are treated as the other non-local signals in the manner generally described above. Preferably, the non-local STM signals are assigned to an optical carrier having a selected wavelength, which wavelength is associated with carrying STM signals. On the other hand, as indicated by arrow 30, STM add-drop multiplexor 28 transmits the local STM signals to STM switch 20, from which, the signals are further processed in a manner well known to those skilled in the art.

If type check 24 categorizes the local signals as ATM signals, then type check 24 preferably transmits the signals as indicated by arrows 31*a*–31*c* to an asynchronous transfer mode (ATM) add-drop multiplexor 32. Further details regarding the preferred ATM add-drop multiplexor 32 is provided below in connection with FIGS. 7–8. As also discussed below in connection with FIGS. 7–8, ATM add-drop multiplexor 32 checks the ATM signals to determine whether they are local signals or are non-local signals.

Again, the careful reader will be correct in noticing that a determination between local and non-local signals will have already been made by type check 24. However, type check 24 made its determination with respect to local/non-local signals based on the wavelength of an entire group of signals. Thus, to be passed from type check 24 as indicated by arrows 25*a*–25*c* to optical wavelength division multiplexor 26, the entire group of signals examined by type check 24 will have to be destined for a different optical network routing apparatus or associated switch.

In contrast, the ATM signals received by ATM add-drop multiplexor 32 may be all local ATM signals, all non-local ATM signals or a combination of local and non-local ATM signals. ATM add-drop multiplexor 32 sorts out the non-local ATM signals from the local ATM signals. In other words, ATM add-drop multiplexor 32 categorizes the ATM signals as local ATM signals or as non-local ATM signals. As indicated by arrows 33*a*–33*c,* ATM add-drop multiplexor 32 transmits the non-local ATM signals to the optical wavelength division multiplexor 26. From there, the non-local ATM signals are treated as the other non-local signals in the manner generally described above. Preferably, the non-local ATM signals are assigned to an optical carrier having a selected wavelength, which wavelength is associated with carrying ATM signals. On the other hand, as indicated by arrow 34, ATM add-drop multiplexor 32 transmits the local ATM signals to ATM switch 10, from which, the signals are further processed in a manner well known to those skilled in the art.

Figure 5:
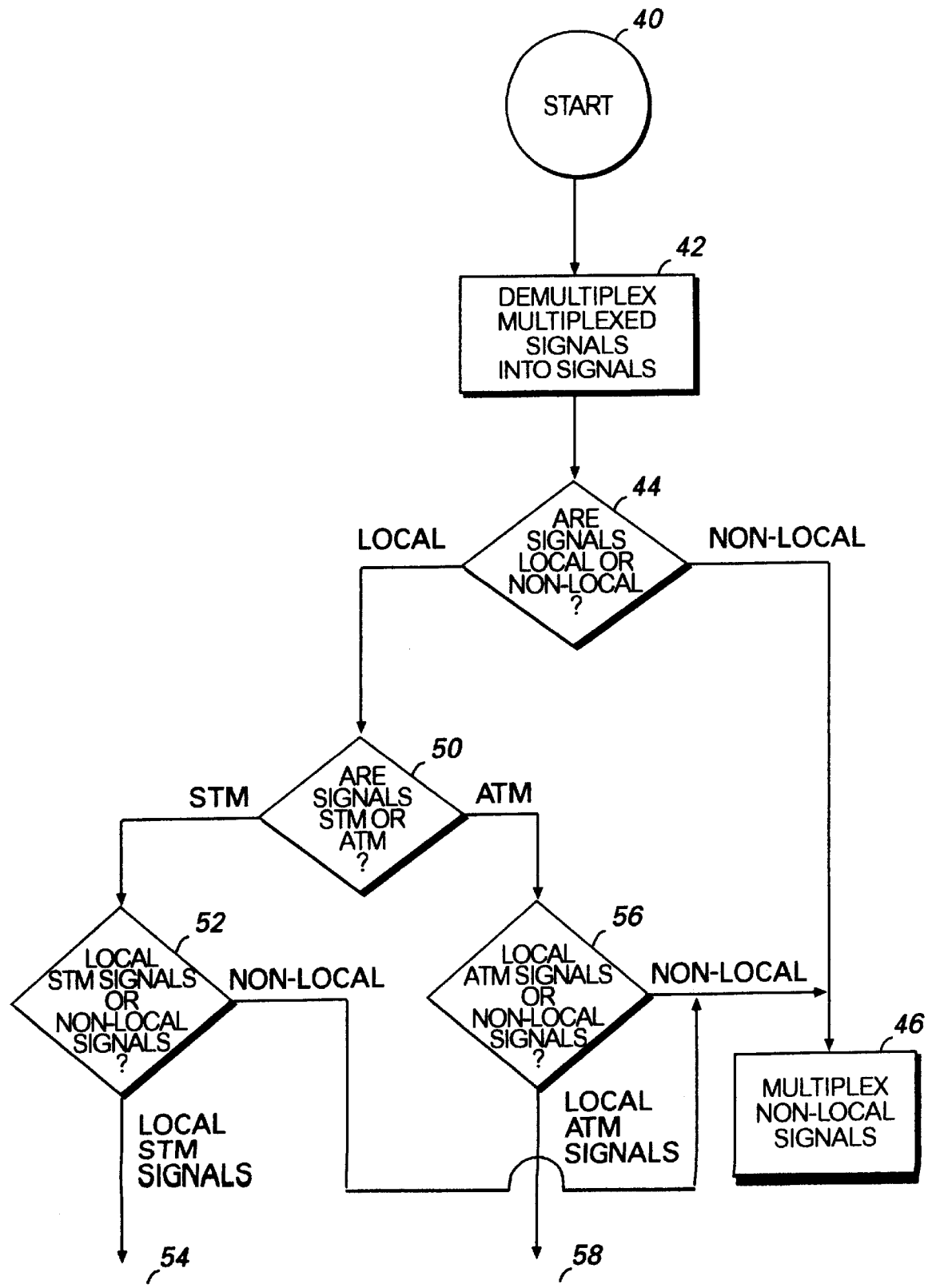
FIG. 5 is a flow chart of the preferred method of routing signals in the preferred embodiment.

Flowchart of the Preferred Method of Routing Signals—FIG. 5

To summarize the routing of signals through a preferred optical network routing apparatus, reference is made to FIG. 5, which is a flow chart of the preferred method. The method is entered at start step 40, and proceeds to step 42 wherein multiplexed signals are demultiplexed into signals. Preferably, these multiplexed signals are demultiplexed into groups of signals based on the respective wavelengths of the optical carriers carrying the groups of signals. In step 44, the signals are checked or categorized as either local signals or non-local signals. Again, this categorization is based on the wavelength of the associated optical carrier carrying the group of signals. If the signals are non-local, then in step 46 the non-local signals are multiplexed and are transmitted for further routing through the optical network. The method then ends in step 48.

On the other hand, referring again to step 44, if the signals are local signals, then in step 50 the local signals are checked or categorized as either STM signals or as ATM signals. Again, this categorization is based on the wavelength of the associated optical carrier carrying the group of signals. If the signals are STM signals, then in step 52 the STM signals are checked or categorized as either STM local signals or as STM non-local signals. If the STM signals are STM non-local signals, then the process proceeds to step 46 wherein the STM non-local signals are multiplexed and transmitted for further routing through the optical network. But if the check in step 52 results in the categorization of the STM signals as local STM signals, then in step 54 the STM local signals are processed for routing to their local destination, and the method ends in step 48.

Referring again to step 50, if the check of the local signals results in a categorization of the local signals as ATM signals, then in step 56 the ATM signals are checked or categorized as either ATM local signals or as ATM non-local signals. If the ATM signals are ATM non-local signals, then the process proceeds to step 46 wherein the ATM non-local signals are multiplexed and transmitted for further routing through the optical network . But if the check in step 56 results in the categorization of the ATM signals as local ATM signals, then in step 58 the ATM local signals are processed for routing t o their local destination, and the method ends in step 48.

Adding Signals to an Optical Network Through an Optical Network Routing Apparatus As noted above, an optical network routing apparatus (ONRA) is an entry/exit point for signals to/from optical network 12 and from/to other networks such as ATM system 10. In the preceding paragraphs, a general explanation has been provided with respect to the function of an optical network routing apparatus as a "throughput" for non-local signals and as an exit for signals from the optical network 12. Below is generally described in connection with FIG. 3, the function of the optical network routing apparatus 14d as an entry point to optical network 12 from an ATM system 10 or from an STM station 20.

To begin with the simplest explanation, STM signals may gain entry in a manner well known to those skilled in the art to optical network 12 from other STM systems or other optical systems through STM station 20 as indicated by arrow 35 to STM add-drop multiplexor 28. As noted above, additional information regarding STM add-drop multiplexor 32 is provided below in connection with FIG. 6. Presumably, the STM signals that are passed from STM station 20 to STM add-drop multiplexor 28 are non-local STM signals, which are destined for one or more optical network routing apparatus (or associated switches) other than optical network routing apparatus 14d. As with the other non-local STM signals, these non-local STM signals are provided by STM add-drop multiplexor 28 as indicated by arrows 29a–29c to optical wavelength division multiplexor 26 for multiplexing and for further routing through the optical network 12. In case any local STM signals have been passed to STM add-drop multiplexor 28, these local STM signals are returned as indicated by arrow 30 to STM station 20.

ATM signals also may gain entry to optical network 12 through optical network routing apparatus 14d by way of ATM switch 10 as indicated by arrow 36 to ATM add-drop multiplexor 32. As noted above, additional information regarding ATM add-drop multiplexor 32 is provided below in connection with FIGS. 7–9. Presumably, the ATM signals that are passed from ATM switch 10 to ATM add-drop multiplexor 32 are non-local ATM signals, which are destined for one or more optical network routing apparatus (or associated switches) other than optical network routing apparatus 14d. As with the other non-local ATM signals, these non-local ATM signals are provided by ATM add-drop multiplexor 32 as indicated by arrows 33a–33c to optical wavelength division multiplexor 26 for multiplexing and for further routing through the optical network 12. In case any local ATM signals have been passed to ATM add-drop multiplexor 28, these local ATM signals are returned as indicated by arrow 36 to ATM switch 10.

Figure 6:
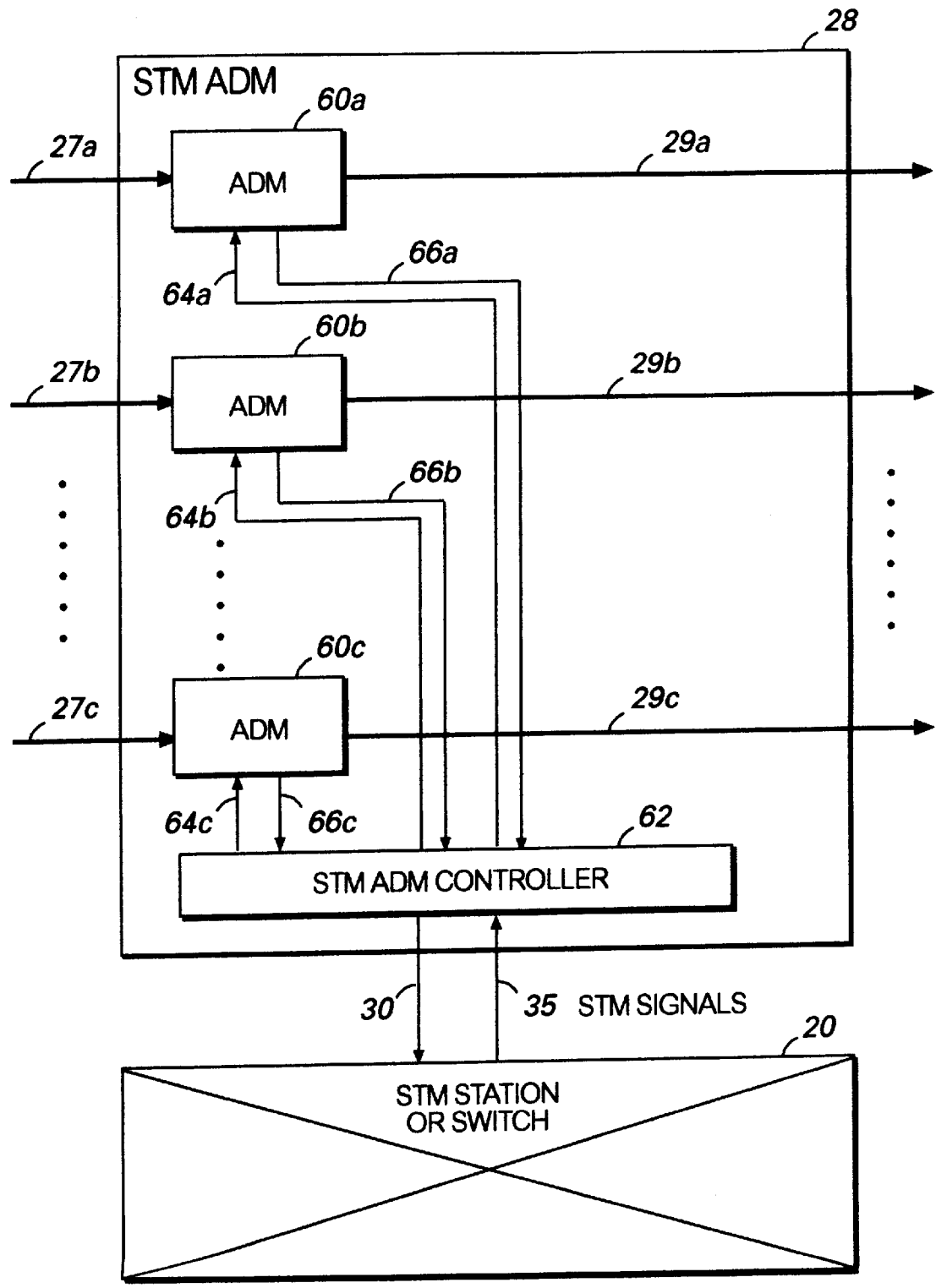
FIG. 6 is a functional block diagram of the preferred STM add-drop multiplexor illustrated in FIG. 4.

The Preferred Synchronous Transfer Mode (STM) Add-Drop Multiplexor—FIG. 6

FIG. 6 is a functional block diagram of the preferred synchronous transfer mode (STM) add-drop multiplexor 28 as generally illustrated in FIG. 4. In the preferred embodiment, STM add-drop multiplexor 28 includes one or more add-drop multiplexors (ADMs) 60a–60c such as are individually conventionally used as hubs or nodes in connection with other SONET networks. FIG. 6 illustrates three add-drop multiplexors 60a–60c, but this number of add-drop multiplexors is only representational to indicate that STM add-drop multiplexor 28 may include one or more add-drop multiplexors. The number of add-drop multiplexors in an STM add-drop multiplexor 28 is a variable that may be defined by a system operator to best accommodate a system's STM traffic. STM add-drop multiplexor 28 also includes an STM add-drop multiplexor controller (STM ADM controller) 62 that provides information, control signals and/or STM signals to the add-drop multiplexors 60a–60c as is described in further detail below. The STM ADM controller 62 generally functions as a signal traffic regulator between the add-drop multiplexors 60a–60e and STM switch 20.

As a general explanation of the functions of the STM add-drop multiplexor 28, it will be understood that a group of STM signals from type check 24 is received at one of the add-drop multiplexors 60a–60c. The add-drop multiplexor determines in a conventional manner from the header information associated with the group of STM signals whether any of the signals within the group of signals are non-local STM signals or are local STM signals. Local STM signals are preferably provided by the add-drop multiplexor to the STM ADM controller 62 for ultimate transmission to STM station 20. Non-local STM signals are preferably provided by the add-drop multiplexor on a designated output to the optical wavelength division multiplexor 26. The multiplexor may then preferably multiplex the non-local STM signals onto an optical carrier operating at a wavelength that is the same as the wavelength of the optical carrier that delivered these non-local STM signals to the optical network routing apparatus 14*d*. These multiplexed signals are then routed further through the optical network 12. Additional details regarding the general statements of functionality set forth in this paragraph are provided below.

In the preferred embodiment, the number of add-drop multiplexors 60*a*–60*c* of STM add-drop multiplexor 28 corresponds directly to the number of inputs to the STM add-drop multiplexor 28 from type check 24. This correspondence between the number of add-drop multiplexors 60*a*–60*c* and inputs from type check 24 is illustrated in FIG. 6 by arrows 27*a*–27*c* for STM signals received from type check 24. Thus, input 27*a* provides STM signals to add-drop multiplexor 60*a*; input 27*b* provides STM signals to add-drop multiplexor 60*b*; input 27*c* provides STM signals to add-drop multiplexor 60*c*; and so on. In addition to an input from type check 24, each add-drop multiplexor 60*a*–60*c* includes an input from STM ADM controller 62. As illustrated in FIG. 6, these inputs 64*a*–64*c* are indicated by arrows 64*a*–64*c* for information, control signals and/or STM signals from STM ADM controller 62. Thus, input 64a provides signals to add-drop multiplexor 60*a*; input 64*b* provides signals to add-drop multiplexor 60*b*; input 64*c* provides signals to add-drop multiplexor 60*c*; and so on.

In addition, each of the add-drop multiplexors 60*a*–60*c* preferably has two outputs: (1) an output for the transmission of non-local STM signals as indicated by arrows 29*a*–29*c* to the optical wavelength division multiplexor 26; and (2) an output for the transmission of local STM signals as indicated by arrows 66*a*–66*c* to STM ADM controller 62 for ultimate delivery of the local STM signals to STM switch 20. Thus, with respect to the first type of output, add-drop multiplexor 60*a* provides signals on output 29*a* to WD Mux 26; add-drop multiplexor 60*b* provides signals on output 29*b* to WD Mux 26; add-drop multiplexor 60*c* provides signals on output 29*c* to WD Mux 26; and so on. And thus, with respect to the second type of output, add-drop multiplexor 60*a* provides signals on output 66*a* to STM ADM controller 62; add-drop multiplexor 60*b* provides signals on output 66*b* to STM ADM controller 62; add-drop multiplexor 60*c* provides signals on output 66*c* to STM ADM controller 62; and so on To put the rather didactic explanation of the inputs and outputs of the add-drop multiplexors 60*a*–60*c* of STM add-drop multiplexor 28 into context, a further description of the functions of the STM add-drop multiplexor 28 is now provided.

As explained generally above, if type check 24 has determined that the demultiplexed signals are STM signals, then STM add-drop multiplexor 28 receives signals from type check 24 as indicated by arrows or inputs 27*a*–27*c*, and in particular, the add-drop multiplexors 60*a*–60*c* receive the signals from the inputs 27*a*–27*c*. It should be noted that three arrows 27*a*–27*c* are illustrated in FIGS. 4 and 6, but this number of arrows is only representational to indicate that type check 24 may pass one or more groups of STM signals to STM add-drop multiplexor 28 on respective one or more inputs. The number of groups of STM signals depends on the number of groups of signals (and/or optical carriers based on their respective wavelengths) that the optical network routing apparatus 14*d* in general and the type check 24 in particular can handle based on system definitions. The number of groups of STM signals passed to STM add-drop multiplexor 28 also depends on the number of groups of STM signals present within any multiplexed signals received by optical network routing agent 14*d*.

Also as indicated by arrows 27*a*–27*c*, the STM add-drop multiplexor 28 preferably receives a particular group of STM signals as carried by an optical carrier of a particular wavelength on a particular input to a particular add-drop multiplexor. For example, STM add-drop multiplexor 28 may receive a first group of STM signals on the input indicated by arrow 27*a* at add-drop multiplexor 60*a*, a second group of STM signals on the input indicated by arrow 27*b* at add-drop multiplexor 60*b*, and a third group of STM signals on the input indicated by arrow 27*c* at add-drop multiplexor 60*c*. By receiving a particular group of STM signals carried by an optical carrier of a particular wavelength on a particular input (such as 27*a*, 27*b* or 27*c*) at a particular add-drop multiplexor 60*a*–60*c*, the STM add-drop multiplexor 28 is able to keep track (so to speak) of the group's associated wavelength. In other words, there is preferably an association between an add-drop multiplexor and an optical carrier operating at a particular wavelength as carried by the optical fiber of the optical network. This association may be defined (and re-defined) as necessary for system operations by the system operator. Thus, if any signals within the group of STM signals are non-local STM signals, then the appropriate add-drop multiplexor may transmit the non-local STM signals to the optical wavelength division multiplexor (WD Mux) 26. Based on the input 29*a*–29*c* carrying the signals, the WD Mux 26 multiplexes the signals onto the optical carrier of the appropriate wavelength. The WD Mux 26 then, in turn, may transmit the multiplexed signals for further routing through the optical network 12.

For example, if add-drop multiplexor 60*a* receives a group of STM signals on input 27*a*, then add-drop multiplexor 60*a* associates this group of STM signals with a particular wavelength of an optical carrier such as 1300 nm. This "association" may be system defined such that no action or determination of wavelength is taken by the add-drop multiplexor 60*a*. In other words, add-drop multiplexor 60*a* may be configured so as to only receive STM signals that are carried by an optical carrier operating at a selected wavelength. Optionally, the add-drop multiplexor 60*a* may be provided with a database and programming to check the wavelength associated with any particular group of STM signals that it receives.

Referring again to the example of the add-drop multiplexor 60*a* receiving a group of STM signals on input 27*a*, if this group of STM signals includes non-local STM signals, then add-drop multiplexor 60*a* transmits the non-local STM signals on a particular output 29*a* to optical wavelength division multiplexor 26. By receipt of these non-local STM signals on optical fiber 29*a*, WD Mux 26 associates this group of non-local STM signals with the particular wavelength of an optical carrier such as 1300 nm, multiplexes this group of non-local STM signals onto an optical carrier operating at that particular wavelength, and transmits the multiplexed signals for further routing through the optical network 12. As before, this "association" may be system defined such that no action or determination of wavelength is taken by the WD Mux 26. In other words, WD Mux 26 may be configured so as to only receive non-local STM signals that are to be carried by an optical carrier operating at a selected wavelength at a preselected input such as input 29a. Optionally, the WD Mux 26 may be provided with a database and programming to check the wavelength associated with any particular group of STM signals that it receives.

If, on the other hand, the group of STM signals received on input 27a at add-drop multiplexor 60a includes local signals, then add-drop multiplexor 60a transmits the local STM signals on output 66a to STM ADM controller 62 for ultimate transmission of the local signals to STM switch 20. It will be appreciated that, as with conventional SONET rings, a group of STM signals may include both local signals and non-local signals. Thus, the add-drop multiplexor that receives a mixed group of STM signals separates the STM local signals from the STM non-local signals in a manner well known to those skilled in the art, and sends the signals to their respective destinations.

As noted above, the STM ADM controller 62 generally functions as a signal traffic regulator between the add-drop multiplexors 60a–60c and STM switch 20. It will be appreciated that the STM ADM controller 62 keeps up with the handling by add-drop multiplexors 60a–60c of local and non-local STM signals generally in a manner well known to those skilled in the art. The difference is that the preferred STM ADM controller 62 keeps up with the signal traffic activities associated with more than one add-drop multiplexor. The preferred STM ADM controller 62 is provided with appropriate programming and a database (not illustrated) for purposes of keeping up with and controlling signal traffic at the add-drop multiplexor. Traffic control features may be defined by the system operator to best suit the system. As in conventional SONET rings, the reason for the STM ADM controller to keep up with the signal traffic activities associated with any particular add-drop multiplexor is so that the STM ADM controller 62 may most effectively allocate bandwidth amongst the add-drop multiplexors 60a–60c for the transmission of STM signals that the STM ADM controller 62 may receive from STM station 20.

For example, with respect to a group of STM signals that are received at add-drop multiplexor 60a, the STM ADM controller 62 keeps track of available bandwidth (bandwidth out) on the optical carrier associated with this group of signals (i.e., operating at a selected wavelength). In particular, the STM ADM controller 62 keeps track of the available bandwidth by keeping track of the local STM signals that are transmitted from add-drop multiplexor 60a to the STM ADM controller 62, by keeping tracking of the non-local STM signals that are transmitted from add-drop multiplexor 60a to WD Mux 26, and by keeping track of other control signals and information signals that may be passed between add-drop multiplexor 60a and controller 62 in a manner well known to those skilled in the art. With respect to keeping track of signal traffic for any particular add-drop multiplexor 60a–60c, STM ADM controller 62 functions in a conventional manner well known to those skilled in the art as would an add-drop multiplexor in a conventional SONET ring. But the STM ADM controller 62 also keeps track of available bandwidth on the optical carriers that are associated with the other add-drop multiplexors 60b–60c of STM add-drop multiplexor 28.

By keeping track of the available bandwidth at any one of the add-drop multiplexors 60a–60c, the STM ADM controller 62 is well positioned to allocate bandwidth (bandwidth in) to STM signals that the STM ADM controller 62 receives for addition to the optical network 12. These STM signals are added to the optical network in a conventional manner except that the STM ADM controller makes a bandwidth allocation for the STM signals to be added based on the information the STM ADM controller has with respect to all of the add-drop multiplexors 60a–60c of the STM add-drop multiplexor 28. For example, if STM ADM controller receives a certain bandwidth of STM signals for addition to the optical network 12 and for further transmission through the optical network 12, then the STM ADM controller 62 checks its information with respect to the bandwidth capacity of any particular optical carrier associated with any of the add-drop multiplexors 60a–60c.

More particularly described, assume that STM ADM controller 62 has received an STS-3c signal for addition to the optical network. STM ADM controller 62 checks its information and notes that a particular add-drop multiplexor has an empty STS-3c pipe. The STM ADM controller 62 then allocates the bandwidth in STS-3c signal to the STS-3c pipe associated with that add-drop multiplexor. For the next group of STM signals received for addition to the optical network, the STM ADM controller 62 may send this next group of STM signals to a different add-drop multiplexor, or even to the same add-drop multiplexor if it has the appropriate STS-nc pipe.

It should be noted that special considerations may determine the allocation of bandwidth amongst the optical carriers corresponding to the add-drop multiplexors 60a–60c. For example, add-drop multiplexor 60a may be associated with an optical carrier that operates at a wavelength that has been assigned for STM signals that are destined for a particular node or destination in the optical network. Other special considerations will be apparent to those skilled in the art. The special considerations may be defined by the system operator, and incorporated in a conventional manner in the programming and database of STM ADM controller 62. Thus, if the optical carrier operating at a selected wavelength associated with add-drop multiplexor 60a has bandwidth available to accommodate the STM signals to be added, (and any special considerations are met) then STM ADM controller will transmit these signals to add-drop multiplexor 60a for addition to the optical network. Add-drop multiplexor 60a then, in turn, provides these "non-local" STM signals on output 29a to WD Mux 26 for multiplexing onto the optical carrier of the wavelength associated with add-drop multiplexor 60 and for further transmission through the optical network 12.

Figure 7:
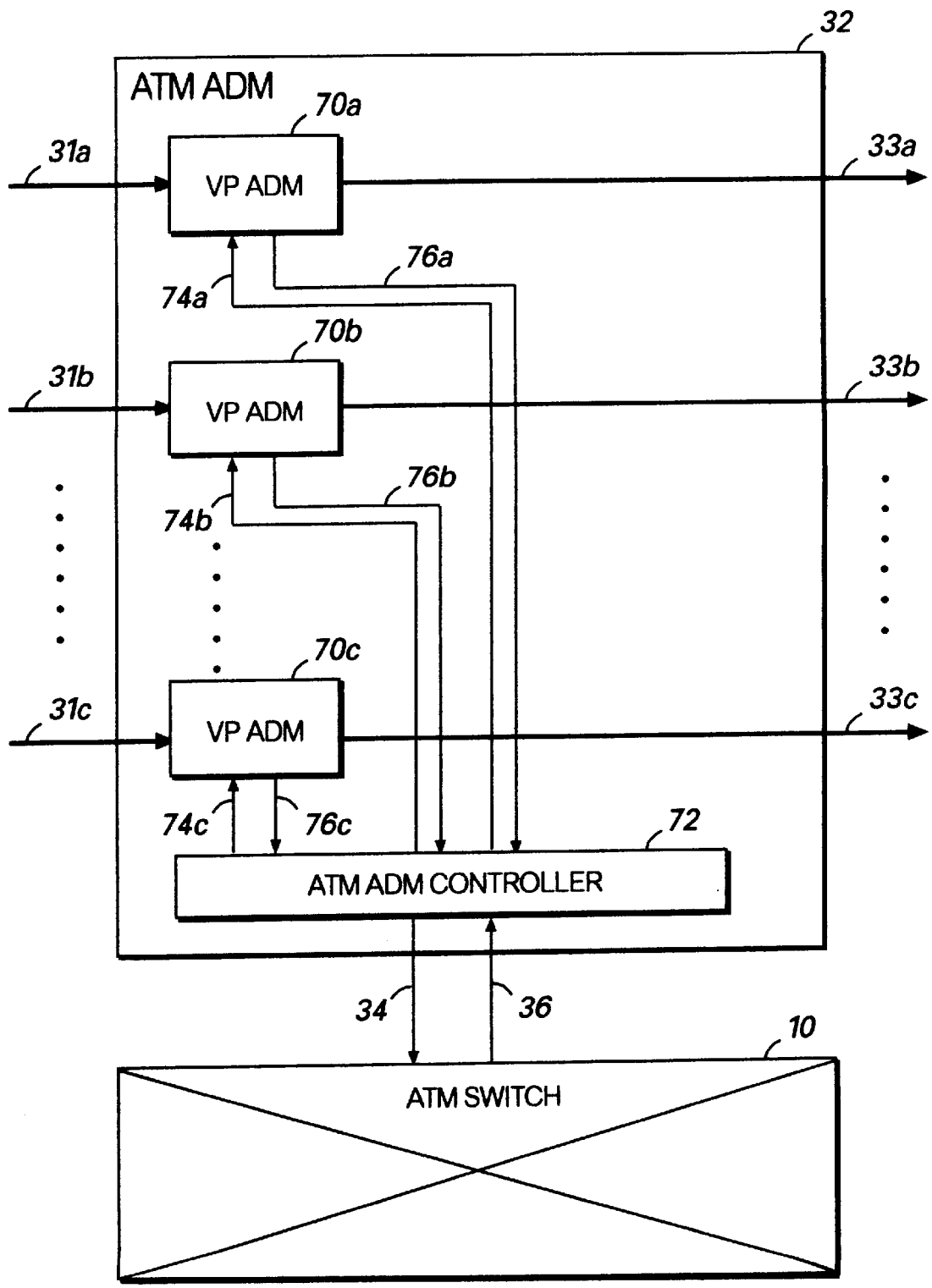
FIG. 7 is a functional block diagram of the preferred ATM add-drop multiplexor illustrated in FIG. 4.

The Preferred Asynchronous Transfer Mode (ATM) Add-Drop Multiplexor—FIG. 7

FIG. 7 is a functional block diagram of the preferred asynchronous transfer mode (ATM) add-drop multiplexor 32 as generally illustrated in FIG. 4. Generally, the preferred ATM add-drop multiplexor functions in the same manner as the STM add-drop multiplexor by sending non-local signals to the WD MUX 26 and by sending local signals to the local switch. Differences between the STM add-drop multiplexor 28 and ATM add-drop multiplexor 32 arise based on the differences in the types of signals (STM vs. ATM) that are handled by the respective multiplexors.

In the preferred embodiment, ATM add-drop multiplexor 32 includes one or more virtual path (VP) add-drop multiplexors (VP ADMs) 70a–70c. Additional detail regarding the VP add-drop multiplexors is provided below in connection with FIGS. 8–9. FIG. 7 illustrates three VP add-drop multiplexors 70a–70c, but this number of VP add-drop multiplexors is only representational to indicate that ATM add-drop multiplexor 32 may include one or more VP add-drop multiplexors. The number of VP add-drop multiplexors in an ATM add-drop multiplexor 32 is a variable that may be defined by a system operator to best accommodate a system's ATM traffic. ATM add-drop multiplexor 32 also includes an ATM add-drop multiplexor controller (ATM ADM controller) 72 that provides information, control signals and/or ATM signals to the VP add-drop multiplexors 70a–70c as is described in further detail below. The ATM ADM controller 72 generally functions as a signal traffic regulator between the VP add-drop multiplexor 70a–70c and ATM switch 10.

Generally, it will be understood that the manner of transmission of ATM signals is described in the art pursuant to the logical convention whereby information is carried in data packets referred to as cells. Cells are transmitted in virtual channels (VCs) which are grouped in virtual paths (VPs). Bandwidth is said to be allocated to VPs.

As a general explanation of the functions of the ATM add-drop multiplexor 32, it will be understood that a group of ATM signals from type check 24 is received at one of the VP add-drop multiplexors 70a–70c. The VP add-drop multiplexor determines whether any of the signals (VPs) within the group of signals are non-local ATM signals or are local ATM signals. This determination is made by the VP add-drop multiplexor on the basis of the virtual path identifier (VPI) that is present in the signals. Local ATM signals are preferably provided by the VP add-drop multiplexor to the ATM ADM controller 72 for ultimate transmission to ATM switch 10. Non-local ATM signals are preferably provided by the VP add-drop multiplexor on a designated output to the optical wavelength division multiplexor 26. The multiplexor may then preferably multiplex the non-local ATM signals onto an optical carrier operating at a wavelength that is the same as the wavelength of the optical carrier that delivered these non-local ATM signals to the optical network routing apparatus 14d. These multiplexed signals are then routed further through the optical network 12. Additional details regarding the general statements of functionality set forth in this paragraph are provided below.

In the preferred embodiment, the number of VP add-drop multiplexors 70a–70c of ATM add-drop multiplexor 32 corresponds directly to the number of inputs to the ATM add-drop multiplexor 32 from type check 24. This correspondence between the number of VP add-drop multiplexors 70a–70c and inputs from type check 24 is illustrated in FIG. 7 by arrows 31a–31c for ATM signals received from type check 24. Thus, input 31a provides ATM signals to VP add-drop multiplexor 70a; input 31b provides ATM signals to VP add-drop multiplexor 70b; input 31c provides ATM signals to VP add-drop multiplexor 70c; and so on. In addition to an input from type check 24, each VP add-drop multiplexor 70a–70c includes an input from ATM ADM controller 72. As illustrated in FIG. 7, these inputs 74a–74c are indicated by arrows 74a–74c for information, control signals and/or ATM signals to/from ATM ADM controller 72. Thus, input 74a provides signals to VP add-drop multiplexor 70a; input 74b provides signals to VP add-drop multiplexor 70b; input 74c provides signals to VP add-drop multiplexor 70c; and so on.

In addition, each of the VP add-drop multiplexors 70a–70c preferably has two outputs: (1) an output for the transmission of non-local ATM signals as indicated by arrows 33a–33c to the optical wavelength division multiplexor 26; and (2) an output for the transmission of local ATM signals as indicated by arrows 76a–76c to ATM ADM controller 72 for ultimate delivery of the local ATM signals to ATM switch 10. Thus, with respect to the first type of output, add-drop multiplexor 70a provides signals on output 31a to WD Mux 26; add-drop multiplexor 70b provides signals on output 31b to WD Mux 26; add-drop multiplexor 70c provides signals on output 31c to WD Mux 26; and so on. And thus, with respect to the second type of output, add-drop multiplexor 70a provides signals on output 76a to ATM ADM controller 72; add-drop multiplexor 70b provides signals on output 76b to ATM ADM controller 72; add-drop multiplexor 70c provides signals on output 76c to ATM ADM controller 72; and so on To put the rather didactic explanation of the inputs and outputs of the VP add-drop multiplexors 70a–70c of ATM add-drop multiplexor 32 into context, a further description of the functions of the ATM add-drop multiplexor 32 is now provided.

As explained generally above, if type check 24 has determined that the demultiplexed signals are ATM signals, then ATM add-drop multiplexor 32 receives signals from type check 24 as indicated by arrows or inputs 31a–31c, and in particular, the add-drop multiplexors 70a–70c receive the signals from the inputs 31a–31c. It should be noted that three arrows 31a–31c are illustrated in FIGS. 4 and 7, but this number of arrows is only representational to indicate that type check 24 may pass one or more groups of ATM signals to ATM add-drop multiplexor 32 or respective one or more inputs. The number of groups of ATM signals depends on the number of groups of signals (and/or optical carriers based on their respective wavelengths) that the optical network routing apparatus 14d in general and the type check 24 in particular can handle based on system definitions. The number of groups of ATM signals passed to ATM add-drop multiplexor 32 also depends on the number of groups of ATM signals present within any multiplexed signals received by optical network routing agent 14d.

Also as indicated by arrows 31a–31c, the ATM add-drop multiplexor 32 preferably receives a particular group of ATM signals as carried by an optical carrier of a particular wavelength on a particular input to a particular VP add-drop multiplexor. For example, ATM add-drop multiplexor 32 may receive a first group of ATM signals on the input indicated by arrow 31a at VP add-drop multiplexor 70a, a second group of ATM signals on the input indicated by arrow 31b at add-drop multiplexor 70b, and a third group of ATM signals on the input indicated by arrow 31c at add-drop multiplexor 70c. By receiving a particular group of ATM signals carried by an optical carrier of a particular wavelength on a particular input (such as 31a, 31b or 31c) at a particular add-drop multiplexor 70a–70c, the ATM add-drop multiplexor 32 is able to keep track (so to speak) of the signal group's associated wavelength. In other words, there is preferably an association between a VP add-drop multiplexor and an optical carrier operating at a particular wavelength as carried by the optical fiber of the optical network. This association may be defined (and re-defined) as necessary for system operations by the system operator. Thus, if any signals within the group of ATM signals are non-local ATM signals, then the appropriate VP add-drop multiplexor may transmit the non-local ATM signals to the WD Mux 26. Based on the input 33a–33c carrying the signals, the WD Mux 26 multiplexes the signals onto the optical carrier of the appropriate wavelength. The WD Mux 26 then, in turn, may transmit the multiplexed signals for further routing through the optical network 12.

For example, if VP add-drop multiplexor 70a receives a group of ATM signals on input 31a, then VP add-drop multiplexor 70a associates this group of ATM signals with a particular wavelength of an optical carrier. This "association" may be system defined such that no action or determination of wavelength is taken by the VP add-drop multiplexor. In other words, VP add-drop multiplexor 70a may be configured so as to only receive ATM signals that are carried by an optical carrier operating at a selected wavelength. Optionally, the add-drop multiplexor 70a may be provided with a database and programming to check the wavelength associated with any particular group of ATM signals that it receives.

Referring again to the example of the VP add-drop multiplexor 70a receiving a group of ATM signals on input 31a, if this group of ATM signals includes non-local ATM signals, then VP add-drop multiplexor 70a transmits the non-local ATM signals on a particular output 33a to optical wavelength division multiplexor 26. By receipt of these non-local ATM signals on optical fiber 33a, WD Mux 26 associates this group of non-local ATM signals with the particular wavelength of an optical carrier, multiplexes this group of non-local ATM signals onto an optical carrier operating at that particular wavelength, and transmits the multiplexed signals for further routing through the optical network 12. As before, this "association" may be system defined such that no action or determination of wavelength is taken by the WD Mux 26. In other words, WD Mux 26 may be configured so as to only receive non-local ATM signals that are to be carried by an optical carrier operating at a selected wavelength at a preselected input such as input 33a. Optionally, the WD Mux 26 may be provided with a database and programming to check the wavelength associated with any particular group of ATM signals that it receives.

If, on the other hand, the group of ATM signals received on input 31a at add-drop multiplexor 70a includes local signals, then add-drop multiplexor 70a transmits the local ATM signals on output 76a to ATM ADM controller 72 for ultimate transmission of the local signals to ATM switch 10. It will be appreciated that, as with conventional ATM systems, a group of ATM signals may include both local ATM signals and non-local ATM signals. Thus, the VP add-drop multiplexor that receives a mixed group of signals separates the local ATM signals from the non-local signals in a manner well known to those skilled in the art, and sends the signals to their respective destinations.

As noted above, the ATM ADM controller 72 generally functions as a signal traffic regulator between the VP add-drop multiplexor 70a–70c and STM switch 20. It will be appreciated that the ATM ADM controller 72 keeps up with the handling of local and non-local ATM signals generally in a manner well known to those skilled in the art. The difference is that the preferred ATM ADM controller 72 keeps up with the signal traffic activities associated with more than one VP add-drop multiplexor.

Like the preferred STM ADM controller 62, the preferred ATM ADM controller 72 is provided with appropriate programming and a database (not illustrated) for purposes of keeping up with and controlling the signal traffic of the VP add-drop multiplexors. Traffic control features may be defined by the system operator to best suit the system. The reason for the ATM ADM controller 72 to keep up with signal traffic activities associated with any particular VP add-drop multiplexor is so that the ATM ADM controller 72 may most effectively allocate bandwidth amongst the VP add-drop multiplexors 70a–70c for the transmission of ATM signals that the ATM ADM controller 72 may receive from ATM switch 10.

For example, with respect to a group of ATM signals that are received at add-drop multiplexor 70a, the ATM ADM controller 72 keeps track of available bandwidth (bandwidth out) on the optical carrier associated with this group of signals (i.e., operating at a selected wavelength). In particular, the ATM ADM controller 72 keeps track of the available bandwidth by keeping track of the local ATM signals that are transmitted from VP add-drop multiplexor 70a to the ATM ADM controller 72, by keeping tracking of the non-local ATM signals that are transmitted from VP add-drop multiplexor 70a to WD Mux 26, and by keeping track of other control signals and information signals that may be passed between VP add-drop multiplexor 70a and controller 72 generally in a manner well known to those skilled in the art. Similarly, the ATM ADM controller 72 also keeps track of available bandwidth on the optical carriers that are associated with the other VP add-drop multiplexors 70b–70c of ATM add-drop multiplexor 32.

By keeping track of the available bandwidth at any one of the add-drop multiplexors 70a–70c, the ATM ADM controller 72 is well positioned to allocate bandwidth (bandwidth in) to ATM signals that the ATM ADM controller 72 receives for addition to the optical network 12. These ATM signals are added to the optical network 12 based on the information the ATM ADM controller has with respect to all of the VP add-drop multiplexors 70a–70c of the ATM add-drop multiplexor 32. For example, if ATM ADM controller receives a certain bandwidth of ATM signals for addition to the optical network 12 and for further transmission through the optical network 12, then the ATM ADM controller 72 checks its information with respect to the bandwidth capacity of any particular optical carrier associated with all of the VP add-drop multiplexors 70a–70c. Additional information regarding a determination of available bandwidth at any particular VP add-drop multiplexor is presented below in connection with FIG. 8. With respect to the available bandwidth amongst the VP add-drop multiplexors 70a–70c, ATM ADM controller 72 allocates bandwidth as it comes available at any particular VP add-drop multiplexor to the ATM signals that the ATM ADM controller 72 receives from ATM switch 10. It should be noted that special considerations may determine the allocation of bandwidth amongst the optical carriers corresponding to the VP add-drop multiplexors 70a–70c. For example, VP add-drop multiplexor 70a may be associated with an optical carrier that operates at a wavelength that has been assigned for signals that are destined for a particular node or destination in the optical network. Other special considerations will be apparent to those skilled in the art. The special considerations may be defined by the system operator, and incorporated in a conventional manner in the programming and database of ATM ADM controller 72. Thus, if the optical carrier operating at a selected wavelength associated with Vp add-drop multiplexor 70a has bandwidth available to accommodate the ATM signals to be added, (and any special considerations are met) then ATM ADM controller will transmit these signals to VP add-drop multiplexor 70a for addition to the optical network. VP add-drop multiplexor 70a then, in turn, provides these "non-local" ATM signals on output 33a to WD Mux 26 for multiplexing onto the optical carrier of the wavelength associated with VP add-drop multiplexor 70 and for further transmission through the optical network 12. Additional details regarding the adding of ATM signals to optical network 12 are provided below in connection with FIG. 8.

Figure 8:
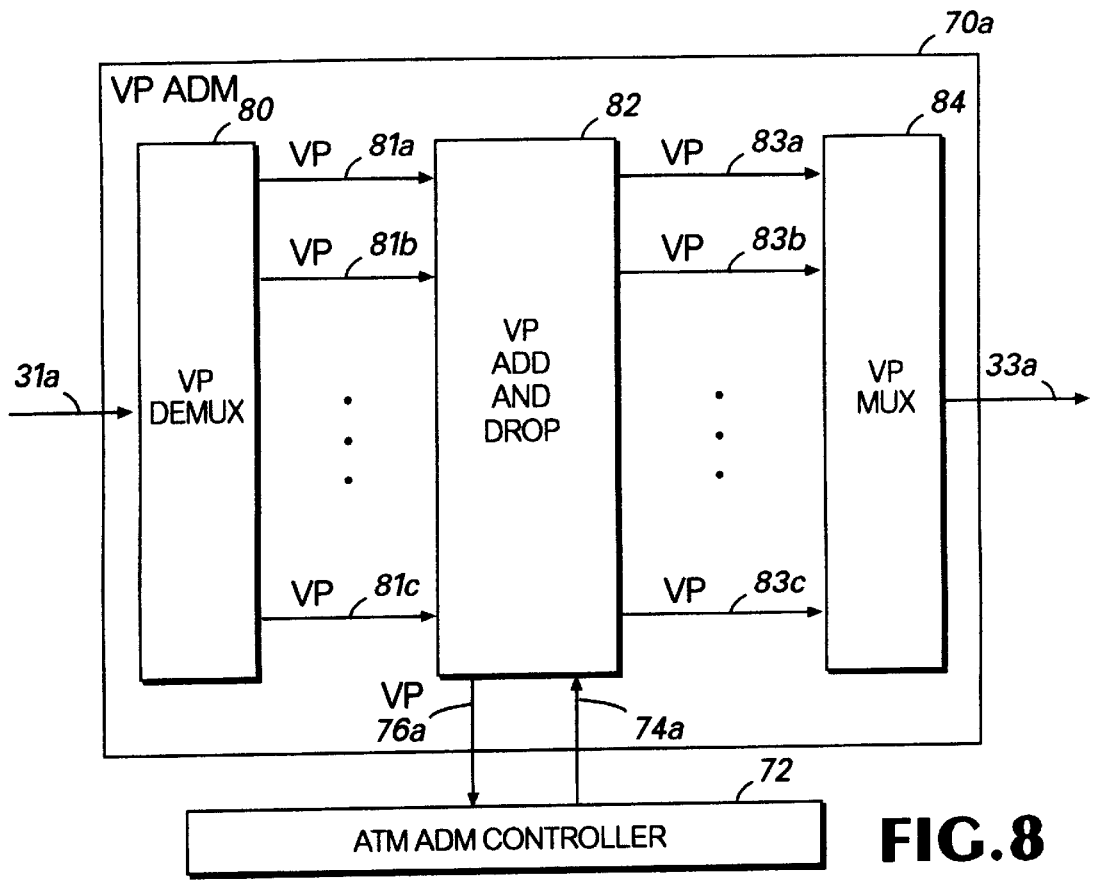
FIG. 8 is a functional block diagram including more detail of the preferred ATM add-drop multiplexor illustrated in FIG. 7.

The Preferred Virtual Path Add-Drop Multiplexor (VP ADM) of the Asynchronous Transfer Mode Add-Drop Multiplexor (ATM ADM)—FIG. 8

FIG. 8 is a functional block diagram including more detail of the preferred asynchronous transfer mode (ATM) add-drop multiplexor generally illustrated in FIG. 7, and in particular, including more detail of the preferred virtual path add-drop multiplexor (VP ADM) of the asynchronous transfer mode add-drop multiplexor (ATM ADM).

Prior to further discussion of the present invention, a bit of background information is provided with respect to what has been called up to now "ATM signals". It will be known to those skilled in the art that ATM signals constitute digital information, and in particular, are referred to as cells. Further information regarding ATM cells may be obtained by reference to the patent application cited above, A Method and System for Interfacing an ATM Switch and an Optical Network. U.S. Ser. No. 08/601,962. For present purposes, suffice it to say that a cell is said to be "transmitted" over a virtual channel. Those skilled in the art will understand that the term "virtual channel" is a commonly used logical convention used as shorthand to refer to the particular process and manner whereby the cell is routed through the ATM system. Cells destined for the same location are transmitted through the same virtual channel based on a virtual channel identifier (VCI) common to each cell. Virtual channels may share common routing characteristics such that a plurality of virtual channels may be grouped together in a "virtual path" for transmission of the information between ATM switches. The term "virtual path" also is a logical convention used as shorthand to refer to the process and manner whereby a plurality of virtual channels are routed along a common path at least through a portion of an ATM system. In other words, certain virtual channels may be multiplexed into a virtual path. Cells destined for the same general location are transmitted through their own respective virtual channels, but are also transmitted in a virtual path based on a virtual path identifier (VPI) common to each cell, as is described in more detail below.

The present invention makes use of the logical convention referenced above to effectively route ATM signals through the optical network 12 and to drop/add ATM signals to/from the optical network 12. As illustrated in FIG. 8, a virtual path add-drop multiplexor such as VP ADM 70a includes a virtual path demultiplexor (VP Demux) 80, which receives the ATM signals on input 31a. The VP Demux 80 then demultiplexes the ATM signals into one or more data streams ("groups of VPs") based on virtual path identifier (VPI or VP identifier). In other words, a data stream having a common virtual path identifier is provided to an output 81a, another data stream having a different common virtual path identifier is provided to an output 81b, yet another data stream having a still different common virtual path identifier is provided to an output 81c, and so on. As indicated by arrows 81a–81c, only three outputs from VP Demux 80 are illustrated on FIG. 8, but this is a representational illustration only. The number of outputs and the correlation between virtual path identifier and output may be defined by the system operator so as to best suit the operation of the system.

The outputs 81a–81c from VP Demux 80 are received as inputs 81a–81c at virtual path add and drop (VP add and drop) 82. As with other elements of the preferred embodiment, the present invention allows for a definition by the system operator of specific inputs (or ports) 81a–81c for the transport of certain groups of ATM signals (VPs) based on VP identifier. With this definition, the virtual add and drop 82 receives a first group of VPs having a certain VP identifier on output 81a, a second group of VPs having a different VP identifier on output 81b, a third group of VPs having yet a different VP identifier on output 81c, and so on. Of course, the system operator may redefine the outputs, and/or provide for fewer or additional outputs. Alternatively, the VP add and drop 82 may be provided with a database and programming to read VP identifiers of the groups of VPs that the VP add and drop receives from VP Demux 80. Based on the VP identifier of any particular group of VPs, the VP add and drop 82 categorizes the group as non-local signals or as local signals. To make this categorization, VP add and drop 82 is configured to include a definition by the system operator of local signals and non-local signals based on a correlation or lack thereof between the VP identifier (or input port) and the local ATM switch 10. For example, VPs received on port 81a may have a VPI=101 indicating that the group of signals is local. In a simpler case, the VP add and drop 82 may be configured so that all signals received on a particular port such as 81a are to be transmitted to the local switch 10. Alternatively, the VP add and drop 82 may be provided with a database and programming to accomplish the necessary tasks.

If the signals are local signals, then VP add and drop 82 provides the local signals on output port 76a to ATM ADM controller 72 for transmission to local switch 10. If the signals are non-local signals, then VP add and drop 82 provides the non-local signals on outputs 83a–83c to virtual path multiplexor (VP Mux) 84. The outputs 83a–83c, as indicated by arrows 83a–83c on FIG. 8, may be defined by the system operator to respectively carry certain groups of signals based on common VP identifiers. For example, output 83a may carry a first group of signals with a common identifier, output 83b may carry a different group of signals with a different common identifier, output 83c may carry yet different group of signals with yet a different common identifier, and so on. The outputs 83a–83c from VP add and drop 82 are received as inputs 83a–83c at VP Mux 84. The preferred embodiment provides for the definition of specific inputs (or ports) 83a–83c by the system operator for the receipt of certain groups of ATM signals (VPs) based on VP identifier. With this definition, the VP Mux 84 receives a first group of VPs having a certain VP identifier on input 83a, a second group of VPs having a different VP identifier on input 83b, a third group of VPs having yet a different VP identifier on input 83c, and so on. Of course, the system operator may redefine the inputs, and/or provide for additional or fewer inputs. Upon receipt of the groups of signals, VP Mux 84 multiplexes the signals based on respective VP identifiers in a manner well known to those skilled in the art, and transmits the multiplexed signals on output 33a to WD Mux 26 (See the relevant discussion associated with FIGS. 4 and 7).

Figure 9:
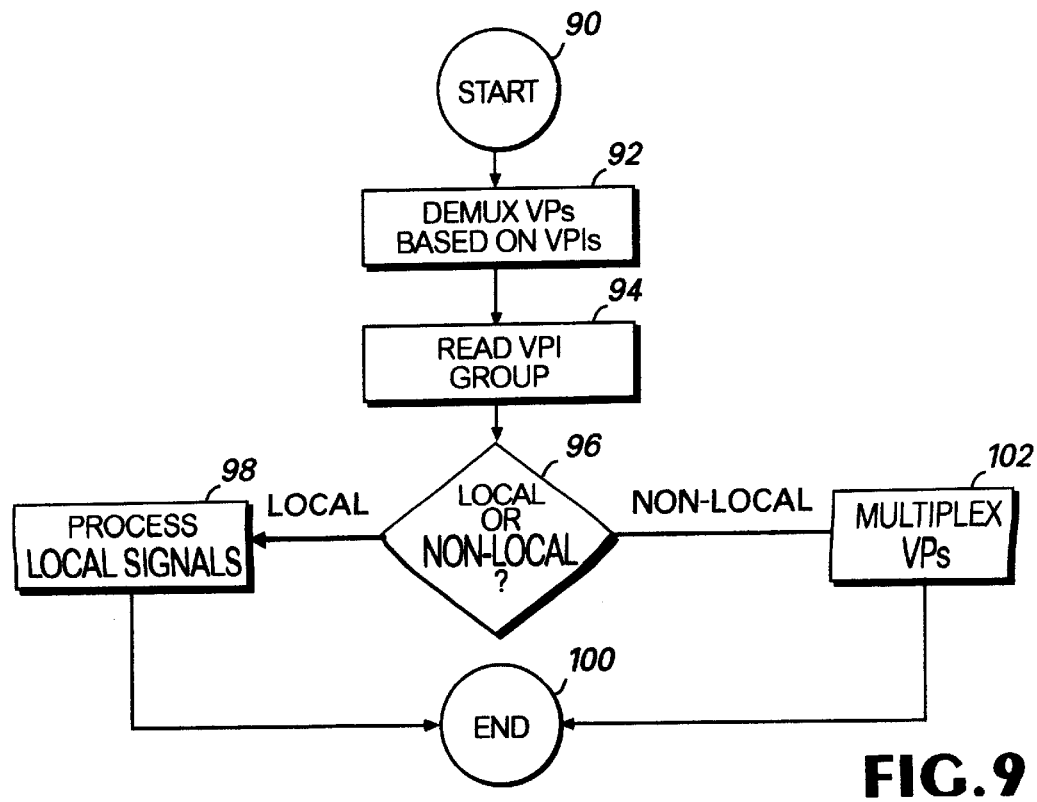
FIG. 9 is a flow chart including more detail of the preferred method of routing ATM signals through a VP add-drop multiplexor.

To summarize the preferred functions performed by a VP add drop multiplexor with respect to the routing of signals, reference is made to FIG. 9. FIG. 9 is a flow chart including more detail of the preferred method of routing ATM signals through a VP add-drop multiplexor. The method is entered at start step 90, and proceeds to step 92 wherein the received group of ATM signals is demultiplexed into separate data streams (VPs) on the basis of common VP identifiers. In step 94, the VPI of a particular data stream (group or VP) is read. In step 96, a check is made to determine whether this VPI identifies the VPs as local signals or as non-local signals. If the signals are local, then in step 98 the local signals are processed in that they are transmitted for delivery to the local switch, and the method ends in step 100. Referring again to check step 96, if the signals are non-local then in step 102 the VPs are multiplexed, and the method ends in step 102.

Referring again to FIG. 8, a general explanation is provided with respect to the functions of the ATM ADM controller 72 in connection with adding ATM signals to the optical network 12. As noted above in the description of the ATM ADM controller 72 in connection with FIG. 7, the ATM ADM controller 72 generally functions as a signal traffic regulator between the VP add-drop multiplexors 70a–70c and STM switch 20. The ATM ADM controller 72 dynamically keeps track of the available bandwidth at any one of the add-drop multiplexors 70a–70c, and thus, the total bandwidth available for the addition of ATM signals to the optical network 12. The ATM ADM controller 72 allocates bandwidth for ATM signals received from ATM switch 10 to any of these multiplexors 70a–70c based on the availability of bandwidth at that multiplexor. To keep track of the available bandwidth at a particular VP add-drop multiplexor such as VP ADM 70a illustrated in FIG. 8, ATM ADM controller 72 is provided by the system operator with a definition of the total bandwidth capacity generally available for ATM signals transported on the input 31a to the VP ADM 70a. For example, the total bandwidth capacity on input 31a may be 155 mbps. Further, the ATM ADM controller 72 keeps track of the available bandwidth of this total bandwidth capacity through information passed back and forth on the ATM ADM controller's connection to the VP ADM 70a and in particular through the ATM ADM controller's connection to the VP add and drop 82 as indicated by arrows 74a, 76a. Further, as a conduit for the transmission of local signals (local VPs) from VP add and drop 82 to ATM switch 10, ATM ADM controller 72 keeps track of the changes in the bandwidth capacity of the VP ADM 70a based on the dropping of local VPs to the ATM switch, and optionally, based on the transmission of non-local VPs to VP Mux 84. Preferably, the ATM ADM controller 72 is provided with programming, informational database, and interfaces to the VP add and drop 82 to accomplish the above described functions.

For example, recall that the total bandwidth capacity on the input 31a to VP ADM 70a is 155 mbps. If 100 mbps of bandwidth in VPs are being transmitted by VP add and drop 82 to VP Mux 84 (a total of all outputs 83a–83c), then there is 55 mbps of bandwidth available for the addition of ATM signals from ATM switch 10. (155 mbps–100 mpbs=55 mpbs). Assume ATM ADM controller 72 has two groups of ATM signals waiting to be added to the optical network 12 including a first group of 45 mbps and a second group of 12 mbps. Then, with 55 mpbs of bandwidth available at this VP ADM 70a at this time, ATM ADM controller 72 may add the first group of ATM signals of 45 mbps to the available bandwidth at this VP ADM. Typically, if there are multiple groups of signals waiting addition to the optical network, the ATM ADM controller 72 selects the group of signals with the largest bandwidth that fits within an available bandwidth of a VP ADM. In other words, in this example, if there were three groups of signals awaiting addition to the optical network with the third group having 60 mbps of bandwidth, the ATM ADM controller 72 typically still selects the group of signals having 45 mbps of bandwidth for addition to the network. Alternatively, other methods such as first in/first out may be adopted for the order of addition of groups of signals to the optical network. In a first in/first out system, the group of signals having 12 mbps of bandwidth may be selected first for addition to the optical network if this group was the "first-in". Other methods will occur to those skilled in the art.

Referring to our example again, if the ATM ADM controller 72 selects the group of signals having a bandwidth of 45 mbps for addition to the optical network, these signals are added by transmitting the signals from ATM ADM controller 72 as indicated by arrow 74a to VP add and drop 82, to VP Mux 84, and ultimately to the optical network 12. As a result of the addition of the first group of signal having a bandwidth of 45 mbps, only 10 mbps of bandwidth remain available at VP ADM 70a at this time. (55 mbps–45 mbps= 10 mbps). Since there is now only 10 mbps of available bandwidth at this VP ADM 70a, the ATM ADM controller 72 could not add the second group of signals of 12 mbps bandwidth to the optical network through VP ADM 70a. Typically, a group of ATM signals is sent in its entirety rather than broken up. However, there may be bandwidth availability at any of the other VP ADMs 70b–70c in the ATM ADM 32. Thus, with respect to the second group of signals of 12 mbps, the ATM ADM controller will check its information resources as to the bandwidth capacity at the other VP ADMs. As is apparent from the brief example provided above, the addition of groups of VPs to the optical network by the ATM ADM controller is a dynamic process that takes into account the available bandwidth based on a determination of available bandwidth at each VP ADM and based on the configuration of the VP groups that are added. As such a dynamic process, the present invention provides for the maximization of the bandwidth capacity of an optical fiber with multiple optical carriers of different wavelengths.

In an alternate embodiment, an interface between the ATM switch 10 and the STM ADM 28 may be provided for the addition of ATM signals through the STM ADM 28 to the optical network 12. This interface is described in the previously referenced patent application entitled A Method and System for Interfacing an ATM Switch and an Optical Network. If the interface is used in connection with the present invention, then the ATM ADM is unnecessary, unless it were to be used for routing different sets of ATM signals that do not pass through the referenced interface.

Advantageously, the method and apparatus of the present invention provide an improved method and apparatus for signal routing in an optical network. The present invention also provides an optical network that includes an optical fiber as a signal transport medium with optical carriers of different wavelengths for the transport of signals. Each additional optical carrier significantly increases the bandwidth capacity of the optical fiber. In addition, the present invention provides an optical network routing apparatus and method that routes the signals transported on the optical carriers of the optical fiber through the optical network and add/drops the signals in an efficient and accurate manner to/from local switches.

Given the foregoing disclosure of the preferred embodiment and design parameters for the present invention, other embodiments of the present invention will suggest themselves to those skilled in the art. Therefore, the scope of the present invention is to be limited only by the claims below.

I claim:

1. In an optical network including optical fibers that carry multiplexed optical signals, said multiplexed optical signals including first signals on a first optical carrier of a first wavelength and second signals on a second optical carrier of a second wavelength, an optical network routing apparatus, comprising:

an optical wavelength division demultiplexor, said demultiplexor being operative
to receive first multiplexed signals from a first optical fiber,
to demultiplex said first multiplexed signals into said first signals based on said first optical carrier having said first wavelength and into said second signals based on said second optical carrier having said second wavelength, and
to transmit said first signals and said second signals to a type check;

said type check being operative
to categorize said first signals and said second signals as local signals or as non-local signals, to transmit said local signals to a local switch, and
to transmit said non-local signals to an optical wavelength division multiplexor; and said optical wavelength division multiplexor being operative
to multiplex said non-local signals into second multiplexed signals, and
to transmit said second multiplexed signals to a second optical fiber for further transport along said optical network; and wherein said type check is further operative
to categorize said first signals or said second signals as synchronous transfer mode (STM) signals, and
to transmit said STM signals to an STM switch.

2. The optical network routing apparatus of claim 1, wherein said type check is further operative
to categorize said first signals as said STM signals based on said first wavelength, and
to categorize said second signals as said STM signals based on said second wavelength.

3. In an optical network including optical fibers that carry multiplexed optical signals, said multiplexed optical signals including first signals on a first optical carrier of a first wavelength and second signals on a second optical carrier of a second wavelength, an optical network routing apparatus, comprising:

an optical wavelength division demultiplexor, said demultiplexor being operative
to receive first multiplexed signals from a first optical fiber,
to demultiplex said first multiplexed signals into said first signals based on said first optical carrier having said first wavelength and into said second signals based on said second optical carrier having said second wavelength, and
to transmit said first signals and said second signals to a type check;

said type check being operative
to categorize said first signals and said second signals as local signals or as non-local signals,
to transmit said local signals to a local switch, and
to transmit said non-local signals to an optical wavelength division multiplexor; and said optical wavelength division multiplexor being operative
to multiplex said non-local signals into second multiplexed signals, and
to transmit said second multiplexed signals to a second optical fiber for further transport along said optical network; and wherein said type check is further operative
to categorize said first signals or said second signals as synchronous transfer mode (STM) signals, and
to transmit said STM signals to an STM add-drop multiplexor; and wherein said STM add-drop multiplexor is operative
to categorize said STM signals as local STM signals or as said non-local signals,
to transmit said local STM signals to a local STM switch, and
to transmit said non-local signals to said optical wavelength division multiplexor.

4. In an optical network including optical fibers that carry multiplexed optical signals, said multiplexed optical signals including first signals on a first optical carrier of a first wavelength and second signals on a second optical carrier of a second wavelength, an optical network routing apparatus, comprising:

an optical wavelength division demultiplexor, said demultiplexor being operative
to receive first multiplexed signals from a first optical fiber,
to demultiplex said first multiplexed signals into said first signals based on said first optical carrier having said first wavelength and into said second signals based on said second optical carrier having said second wavelength, and
to transmit said first signals and said second signals to a type check;

said type check being operative
to categorize said first signals and said second signals as local signals or as non-local signals,
to transmit said local signals to a local switch, and
to transmit said non-local signals to an optical wavelength division multiplexor; and said optical wavelength division multiplexor being operative
to multiplex said non-local signals into second multiplexed signals, and
to transmit said second multiplexed signals to a second optical fiber for further transport along said optical network; and wherein said type check is further operative
to categorize said first signals or said second signals as asynchronous transfer mode (ATM) signals, and
to transmit said ATM signals to an ATM add-drop switch.

5. The optical network routing apparatus of claim 4, wherein said type check is further operative
to categorize said first signals as said ATM signals based on said first wavelength, and
to categorize said second signals as said ATM signals based on said second wavelength.

6. In an optical network including optical fibers that carry multiplexed optical signals, said multiplexed optical signals including first signals on a first optical carrier of a first wavelength and second signals on a second optical carrier of a second wavelength, an optical network routing apparatus, comprising:

an optical wavelength division demultiplexor, said demultiplexor being operative
to receive first multiplexed signals from a first optical fiber,
to demultiplex said first multiplexed signals into said first signals based on said first optical carrier having said first wavelength and into said second signals based on said second optical carrier having said second wavelength, and
to transmit said first signals and said second signals to a type check;

said type check being operative
to categorize said first signals and said second signals as local signals or as non-local signals,
to transmit said local signals to a local switch, and
to transmit said non-local signals to an optical wavelength division multiplexor; and said optical wavelength division multiplexor being operative
to multiplex said non-local signals into second multiplexed signals, and
to transmit said second multiplexed signals to a second optical fiber for further transport along said optical network; and wherein said type check is further operative to categorize said first signals or said second signals as asynchronous transfer mode (ATM) signals, and to transmit said ATM signals to an ATM add-drop multiplexor; and wherein said ATM add-drop multiplexor is operative to categorize said ATM signals as local ATM signals or as said non-local signals, to transmit said local ATM signals to a local ATM switch, and to transmit said non-local signals to said wavelength division multiplexor.

7. An optical network routing apparatus for routing optical signals in an optical network, comprising:

an optical wavelength division demultiplexor being operative to receive first multiplexed signals from a first optical fiber, to demultiplex said first multiplexed signals into first signals based on a first wavelength of a first optical carrier of said optical fiber and into second optical signals based on a second wavelength of a second optical carrier of said optical fiber, and to transmit said first signals and said second signals to a type check;

said type check being operative to receive said first signals and said second signals from said optical wavelength division demultiplexor, to categorize said first signals and said second signals as non-local signals, as synchronous transfer mode (STM) signals or as asynchronous transfer mode (ATM) signals, said characterization of said first signals and said second signals being based on said respective first wavelength and said second wavelength, to transmit said non-local signals to an optical wavelength division multiplexor, to transmit said STM signals to an STM add-drop multiplexor, and to transmit said ATM signals to an ATM add-drop multiplexor; and said STM add-drop multiplexor being operative to receive said STM signals, to categorize said STM signals as local STM signals or as said non-local signals, to transmit said local STM signals to an STM switch, and to transmit said non-local signals to said optical wavelength division multiplexor;

said ATM add-drop multiplexor being operative to receive said ATM signals, to categorize said ATM signals as local ATM signals or as said non-local signals, to transmit said local ATM signals to an ATM switch, and to transmit said non-local signals to said optical wavelength division multiplexor; and said optical wavelength division multiplexor being operative to receive said non-local signals, to multiplex said non-local signals into second multiplexed signals, and to transmit said second multiplexed signals to a second optical fiber for further routing in said optical network.

8. In an optical network including optical fibers that carry multiplexed signals, said multiplexed optical signals including first signals on a first optical carrier of a first wavelength and second signals on a second optical carrier of a second wavelength, a method for routing signals through said optical network, comprising:

demultiplexing with an optical wavelength division demultiplexor first multiplexed signals into said first signals based on said first optical carrier having said first wavelength and into said second signals based on said second optical carrier having said second wavelength;

checking whether said first signals and said second signals are local signals or are non-local signals;

if either said first signals or said second signals are said local signals, then checking whether said local signals are synchronous transfer mode (STM) signals or are asynchronous transfer mode (ATM) signals;

if said local signals are STM signals, then checking whether said STM signals are local STM signals or are said non-local signals;

if said STM signals are said local STM signals, then processing said local STM signals to a local STM switch;

if said local signals are ATM signals, then checking whether said ATM signals are local ATM signals or are said non-local signals;

if said ATM signals are said local ATM signals, then processing said local ATM signals to a local ATM switch;

with respect to said non-local signals, multiplexing with an optical wavelength division multiplexor said non-local signals into second multiplexed signals; and transmitting said second multiplexed signals for further routing in said optical network.

* * * * *